United States Patent
Lee

(10) Patent No.: US 8,560,134 B1
(45) Date of Patent: Oct. 15, 2013

(54) SYSTEM AND METHOD FOR ELECTRIC LOAD RECOGNITION FROM CENTRALLY MONITORED POWER SIGNAL AND ITS APPLICATION TO HOME ENERGY MANAGEMENT

(75) Inventor: Kwangduk Douglas Lee, Redwood City, CA (US)

(73) Assignee: Kwangduk Douglas Lee, Redwood City, CA (US)

( * ) Notice: Subject to any disclaimer, the term of this patent is extended or adjusted under 35 U.S.C. 154(b) by 428 days.

(21) Appl. No.: 12/879,983

(22) Filed: Sep. 10, 2010

(51) Int. Cl.
*G05D 3/12* (2006.01)

(52) U.S. Cl.
USPC ................... 700/291; 700/28; 700/49

(58) Field of Classification Search
USPC ............. 700/28–32, 47–50, 286, 291, 297
See application file for complete search history.

(56) References Cited

U.S. PATENT DOCUMENTS

| | | | |
|---|---|---|---|
| 4,672,555 A | 6/1987 | Hart et al. | |
| 4,858,141 A * | 8/1989 | Hart et al. | 702/61 |
| 4,990,893 A | 2/1991 | Kiluk | |
| 5,196,982 A | 3/1993 | Landsberg et al. | |
| 5,325,051 A | 6/1994 | Germer et al. | |
| 5,483,153 A | 1/1996 | Leeb et al. | |
| 5,566,084 A | 10/1996 | Cmar | |
| 5,696,695 A | 12/1997 | Ehlers et al. | |
| 5,717,325 A | 2/1998 | Leeb et al. | |
| 5,910,875 A | 6/1999 | Tian et al. | |
| 6,081,123 A | 6/2000 | Kasbarian et al. | |
| 6,105,000 A | 8/2000 | Hickman et al. | |
| 6,108,624 A | 8/2000 | Park | |
| 6,122,603 A | 9/2000 | Budike, Jr. | |
| 6,148,623 A | 11/2000 | Park et al. | |
| 6,178,362 B1 | 1/2001 | Woolard et al. | |
| 6,330,516 B1 | 12/2001 | Kammeter | |
| 6,366,889 B1 | 4/2002 | Zaloom | |
| D458,864 S | 6/2002 | Keeler et al. | |
| 6,507,669 B1 | 1/2003 | Klassen | |
| 6,529,839 B1 | 3/2003 | Uggerud et al. | |
| 6,577,962 B1 | 6/2003 | Afshari | |
| 6,633,823 B2 | 10/2003 | Bartone et al. | |
| 6,636,893 B1 | 10/2003 | Fong | |

(Continued)

OTHER PUBLICATIONS

Baranski, M. et al.; "Non-Intrusive Appliance Load Monitoring based on an Optical Sensor"; Jun. 23-23, 2003; IEEE Bologna PowerTech Conference; Bologna, Italy, 8 pages.

(Continued)

*Primary Examiner* — Carlos Ortiz Rodriguez
(74) *Attorney, Agent, or Firm* — Michael A. Glenn; Perkins Coie LLP

(57) ABSTRACT

A method and apparatus are provided for a home energy management platform. The platform includes using a whole house power sensor or subset thereof. Data from the power sensor are analyzed using advanced statistical and machine learning techniques for extracting detailed usage information and generating specific energy saving measures, among other relevant information. In an embodiment, a gateway console is provided that has various communication capabilities. The gateway console may communicate with and control HAN devices. The gateway console may collect data from the power sensor as well as HAN devices and upload such collected data to servers for the analysis processing. Certain amounts of data processing and analysis may be performed at a server or at the local level, such as at the power sensor, gateway, or other HAN device, as well. The platform may include a user interface, such as web, mobile, email, mail, phone call, etc.

17 Claims, 21 Drawing Sheets

(56) References Cited

U.S. PATENT DOCUMENTS

| | | | |
|---|---|---|---|
| 6,785,592 | B1 | 8/2004 | Smith et al. |
| 6,816,078 | B2 | 11/2004 | Onoda et al. |
| 6,850,735 | B2 | 2/2005 | Sugar et al. |
| 6,853,958 | B1 | 2/2005 | Turin et al. |
| 6,862,540 | B1 | 3/2005 | Welch et al. |
| 6,865,450 | B2 | 3/2005 | Masticola et al. |
| 6,868,293 | B1 | 3/2005 | Schurr et al. |
| 6,910,025 | B2 | 6/2005 | Cao |
| 6,937,946 | B1 | 8/2005 | Culp et al. |
| 6,993,417 | B2 | 1/2006 | Osann, Jr. |
| 6,996,508 | B1 | 2/2006 | Culp et al. |
| 7,069,161 | B2 | 6/2006 | Gristina et al. |
| 7,130,832 | B2 | 10/2006 | Bannai et al. |
| 7,135,956 | B2 | 11/2006 | Bartone et al. |
| 7,184,860 | B2 | 2/2007 | Nakajima et al. |
| 7,206,670 | B2 | 4/2007 | Pimputkar et al. |
| 7,219,069 | B2 | 5/2007 | Fouquet |
| 7,222,111 | B1 | 5/2007 | Budike, Jr. |
| 7,225,089 | B2 | 5/2007 | Culp et al. |
| 7,243,044 | B2 | 7/2007 | McCalla |
| 7,254,497 | B2 | 8/2007 | Downey et al. |
| 7,265,533 | B2 | 9/2007 | Lightbody et al. |
| 7,282,921 | B2 | 10/2007 | Sela et al. |
| 7,317,404 | B2 | 1/2008 | Cumeralto et al. |
| 7,356,548 | B1 | 4/2008 | Culp et al. |
| 7,363,208 | B2 | 4/2008 | Cao |
| 7,392,115 | B2 | 6/2008 | Schindler |
| 7,409,303 | B2 | 8/2008 | Yeo et al. |
| 7,424,343 | B2 | 9/2008 | Kates |
| 7,453,267 | B2 | 11/2008 | Westbrock, Jr. et al. |
| 7,526,391 | B2 | 4/2009 | Bickel |
| 7,541,941 | B2 | 6/2009 | Bogolea et al. |
| 7,552,033 | B1 | 6/2009 | Culp et al. |
| 7,571,028 | B2 | 8/2009 | Lapinski et al. |
| 7,653,443 | B2 | 1/2010 | Flohr |
| 7,693,670 | B2 | 4/2010 | Durling et al. |
| 7,715,951 | B2 | 5/2010 | Forbes, Jr. et al. |
| 2005/0116836 | A1 | 6/2005 | Perry et al. |
| 2006/0200542 | A1 | 9/2006 | Willig |
| 2008/0091345 | A1 | 4/2008 | Patel et al. |
| 2009/0072985 | A1 | 3/2009 | Patel et al. |
| 2009/0195349 | A1 | 8/2009 | Frader-Thompson et al. |
| 2009/0292486 | A1 | 11/2009 | Van Gorp et al. |
| 2009/0307178 | A1 | 12/2009 | Kuhns et al. |
| 2010/0007655 | A1 | 1/2010 | Agronin et al. |
| 2010/0030393 | A1 | 2/2010 | Masters et al. |
| 2010/0070101 | A1 | 3/2010 | Benes et al. |
| 2010/0070102 | A1 | 3/2010 | Benes et al. |
| 2010/0076615 | A1 | 3/2010 | Daniel et al. |
| 2010/0100253 | A1 | 4/2010 | Fausak et al. |
| 2010/0109842 | A1 | 5/2010 | Patel et al. |
| 2010/0161148 | A1 | 6/2010 | Forbes et al. |

OTHER PUBLICATIONS

Baranski; M. et al.; "Genetic Algorithm for Pattern Detection in NIALM Systems"; Oct. 2004 IEEE Int'l Conference on Systems, Man and Cybernetics; 7 pages.

Baranski, M. et al.; "Detecting Patterns of Appliances from Total Load Data Using a Dynamic Programming Approach"; Nov. 2004; Proc. of the 4th IEEE Int'l Conf. on Data Mining; 4 pages.

Berges, at al.; "Training Load Monitoring Algorithms on Highly Sub-Metered Home Electricity Consumption Data"; Oct. 2008; Tsinghua Science and Technology; vol. 13, No. S1; pp. 406-411.

Berges, et al.: "Learning Bystems for Electric Consumption of Buildings"; Jun. 2009; Proc. of the 2009 ASCE Int'l Workshop on Computing in Civil Engineering; Austin TX, 10 pages.

Bijker, A. et al; "Active Power Residential Non-intrusive Appliance Load Monitoring System"; Sep. 23-25, 2009; IEEE AFRICON, Nairobi, Kenya, 6 pages.

Chang, Hsueh-Hsien et al.; "Load Recognition for Different Loads with the Same Real Power and Reactive Power in a Non-intrusive Load-monitoring System"; Apr. 2008; IEEE 12th Int'l Conf. on Computer Supported Cooperative Work in Design, 6 pages.

Chang, Hsueh-Hsien at al; "Load Identification in Nonintrusive Load Monitoring Using Steady-State and Turn-on Transient Energy Algorithms"; Apr. 2010; Proc. of the 2010 14th Int'l Conf. on Computer Supported Cooperative Work in Design; 6 pages.

Clifford, Z. et al.; "A Retrofit 60 Hz Current Sensor for Non-intrusive Power Monitoring at the Circuit Breaker"; Feb. 2010: The Applied Power Electronics Conference and Exposition; 8 pages.

Cole, A. et al.; "Algorithm for Non-Intrusive Identification of Residential Appliances"; May-Jun. 1998, IEEE Int'l Symposium on circuits and Systems, pp. III-338 through III-341.

Cole, A. et al.; "Data Extraction for Effective Non Intrusive Identification of Residential Power Loads"; May 18-21, 1998; IEEE instrumentation and Measurement Technology Conference; St. Paul, Minnesota, USA, pp. 812-815.

Cox, R. at al,; "Using the Non-Intrusive Load Monitor for Shipboard Supervisory Control"; May 2007; IEEE Symposium on Electric Ship Technologies; Arlington, VA; pp. 523-530.

Cox, R,. at al; "Transient Event Detection for Nonintrusive Load Monitoring and Demand Side Management Using Voltage Distortion,"; 2006; IEEE, pp. 1751-1757.

Lee, K. Douglas; "Electric Load Information System based on Non-Intrusive Power Monitoring"; Jun. 2003; Thesis, Massachusetts Institute of Technology; 200 pages.

Drenker, S. et el.; "Nonintrusive Monitoring"; Oct. 1999; IEEE; pp. 47-51.

El Guedri, M.; "RJMCMC Point Process Sampler for Single Sensor Source Separation: An Application to Electric Load Monitoring"; Aug. 24-28, 2009; 17th European Signal Processing Conf. (EUSIPCO 2009); Glasgow, Scotland; pp. 1062-1066.

Kondepudi, S.; "Low-Cost NIALMS Technology, Market Issue and Product Assessment"; Sep. 1997; Final Report No. TR-108918-V1, 70 pages.

Hart, George W.; "Nonintrusive Appliance Load Monitoring"; Dec. 1992; IEEE, vol. 80, No. 12, pp. 1870-1891.

Hart, George W.; "Residential Energy Monitoring and Computerized Surveillance via Utility Power Flows"; Jun. 1989; IEEE Technology and Society Magazine, pp. 12-16.

Kamat, Sachin P.; "Fuzzy Logic Based Pattern Recgnition Technique for Non-Intrusive Load Monitoring"; 2004, IEEE, pp. 528-530.

Katsukura, M. et al.; "Life Pattern Sensor with Non-intrusive Appliance Monitoring"; Jan. 2009; IEEE Int'l Conference on Consumer Electronics, 2 pages.

Laughman, et al.; "Power Signature Analysis"; Mar./Apr. 2003, IEEE Power & Energy Magazine; pp. 56-63.

Lee, W. K.; "Exploration on Load Signatures"; 2004 Int'l Conf. on Electrical Engineering, Japan, 5 pages.

Lee, K. Douglas; "Estimation of Variable-Speed-Drive Power Consumption From Harmonic Content"; Sep. 2005; IEEE Transactions on Energy Conversion; vol. 20, No. 3; pp. 566-574.

Liang, Jian et al.; "Load Signature Study—Part II: Disaggregation Framework, Simulation and Applications"; Apr. 2010; IEEE Transactions on Power Delivery; vol. 25, No. 2; pp. 561-569.

Liang, Jian et al.; "Load Signature Study—Part I: Basic Concept, Structure, and Methodology"; Apr. 2010, vol. 25, No. 2, pp. 551-560.

Matthews, HS et al.; "Automatically Disaggregating the Total Electrical Load in Residential Buildings: a Profile of the Required Solution"; 2008; Intelligent Computing in Engineering; pp. 381-389.

Murata, H. et al.; "Estimation of Power Consumption for Household Electrical Appliances"; Nov. 2002; Proc. of the 9th Int'l Conf. on Neural Information Processing; vol. 5, pp. 2299-2303.

Najmeddine, Hala et al.; "State of art on load monitoring methods"; Dec. 1-3, 2008; 2nd IEEE Int'l Conf. on Power and Energy; Johor Baharu, Malaysia; pp. 1256-1258.

Nakano, et al.; "Non-Intrusive Electric Appliances Load Monitoring System Using Harmonic Pattern Recognition—Performance Test Results at Real Households"; Jul. 2006; Int'l Energy Efficiency in Domestic Appliances & Lighting Conference; Korea; 11 pages.

Norford et al; "Non-intrusive electrical load monitoring in commercial buildings based on steady-state and transient load-detection algorithms"; 1996; Energy and Buildings; Elsevier Sciences SA; pp. 51-84.

(56) References Cited

OTHER PUBLICATIONS

Onoda, T. et al.; "Experimental Analysis of Support Vector Machines with Different Kernels based on Non-Intrusive Monitoring Data"; May 2002; IEEE International Joint Conference on Neural Networks; pp. 2185-2191.

Orji, U. et al.; "Fault Detection and Diagnostics for Non-Intrusive Monitoring using Motor Harmonics"; Feb. 2010: Applied Power Electronics Conference; pp. 1547-1554.

Pihala, Hannu; "Non-intrusive appliance load monitoring system based on a modern kWh-meter"; May 1998 Technical Research Centre of Finland Espoo, VTT Publications 356; 71 pages.

Powers, John et al; "Using a Rule-Based Algorithm to Disaggregate End-Use Load Profiles from Premise-Level Data"; Apr. 1991; IEEE Computer Applications in Power, vol. 4, Issue 2; 6 pages.

Paatero, J, et al.; "A model for generating household electricity load profiles"; published online Jul. 2005 in Wiley InterScience (wwww.interscience.wiley.com); preprint of article published in Int'l Journal of Energy Research 2006, vol. 30, No. 5, pp. 273-290.

Roos, JG et al.; "Using Neural Networks for Non-intrusive Monitoring of Industrial Electrical Loads"; May 10-12, 1994; IMTC '94; Hamamatsu; pp. 1115-1118.

Saito, Takeshi et al.; "Current Sensor based Non-intrusive Appliance Recognition for Intelligent Outlet"; Jul. 2008, the 23rd Int'l Technical Conf. on Circuits/Systems, Computers and Communications; pp. 349-352.

Sawyer, Rebecca L. et al.; "Creating Low-Cost Energy-Management Systems for Homes Using Non-intrusive Energy Monitoring Devices"; 2009 IEEE, pp. 3239-3246.

Shaw, at al.; "Nonintrusive Load Monitoring and Diagnostics in Power Systems"; Jul. 2008; IEEE Transactions on Instrumentation and Measurement, vol. 57, No. 7, pp. 1445-1454.

Shrestha, Arun et al.; "Dynamic Load Shedding for Shipboard Power Systems Using the Non-Intrusive Load Monitor"; Apr. 2009; IEEE Electric Ship Technologies Symposium; pp. 412-419.

Berry, Linda; "New Tool Makes Load Monitoring Easier"; Sep./Oct. 2001; Home Energy; www.homeenergy.org, 1 page.

Sultanem, F.; "Using Appliance Signatures for Monitoring Residential Loads At Meter Panel Level"; Oct. 1991; IEEE Transactions on Power Delivery, vol. 6, No. 4, pp. 1380-1385.

Suzuki, K. et al.; "Nonintrusive Appliance Load Monitoring Based on Integer Programming"; Aug. 20-22, 2008; SICE Annual Conf. 2008, The University Electro-Communications, Japan, pp. 2742-2747.

Ting, K.H. et al.; "A Taxonomy of Load Signatures for Single-Phase Electric Appliances"; Jun. 12-18, 2005; IEEE Power Electronics Specialist Conf.; Brazil, 6 pages.

Patel, S. et al.; "At the Flick of a Switch: Detecting and Classifying Unique Electrical Events on the Residential Power Line"; Sep. 2007; UbiComp, LNCS 4717, Springer-Verlag, Berlin, pp. 271-288.

"End-User-Deployable Whole House Contact-Less Power Consumption Sensing"; Sep. 30-Oct. 3, 2009; UbiComp 2009; Orlando Florida, 4 pages.

Yamagami, Shin et al.; Non-Intrusive Submetering of Residential Gas Appliances, Aug. 1996; ACEEE Summer Study on Energy Efficiency in Buildings, Pacific Grove, CA, 11 pages.

Yang, Hong-Tzer et al.; "Design a Neural Network tor Features Selection in Non-intrusive Monitoring of Industrial Electrical Loads"; Apr. 2007; Proc. of the 2007 11th Int'l Conf. on Computer Supported Cooperative Work in Design, pp. 1022-1027.

Yu, Yi-xin et al.; Non-Intrusive Method for On-Line Power Load Decomposition; Dec. 2008: CICED 2008, Technical Session 1, Distribution network equipment; Guangzhou: China, 8 pages.

\* cited by examiner (Electric range (large element))

(Furnace (ignitor + fan))

(Event classifier can handle both single and composite load events at the same time.)

(Unstructured classification – event matching examples)

(Event classifier works well even when there is a baseload change.)

SYSTEM AND METHOD FOR ELECTRIC LOAD RECOGNITION FROM CENTRALLY MONITORED POWER SIGNAL AND ITS APPLICATION TO HOME ENERGY MANAGEMENT

BACKGROUND OF THE INVENTION

1. Technical Field

The invention relates to home energy management systems. More particularly, the invention relates to a method and apparatus for incorporating and applying advanced analytics into a home energy management system for providing detailed usage information and energy saving tips, among other relevant data.

2. Description of the Background Art

Home energy management is a newly emerging market with widespread deployment of smart grid infrastructure. A smart grid allows two-way flow of energy and information between an appliance, such as a refrigerator, and a controller, such as a processor residing on a smart meter or even on a server. As well, a smart grid allows two-way flow of information between smart meters and utilities.

Smart Meter

A smart meter is an advanced meter at a consumption site, can measure utility consumption, e.g. consumption of electricity, at the site and is in communication with the utility company at another site, such that the smart meter can send the consumption-related data to the utility company for billing and other purposes. A smart grid infrastructure is the associated network structure that typically includes the smart meter.

Most smart meters have chips embedded, such as a Zigbee chip ("Zigbee"), by Zigbee Alliance. Other communication devices can communicate with smart meters by powerline networking and wireless local area network (WLAN) protocols. However, the Zigbee based home area network (HAN) protocol seems to be becoming standard.

HAN Appliances

Some homes have appliances that are HAN appliances. HAN appliances or devices are appliances/devices that connect to home area networks and can communicate with central controllers and/or smart meters. Information, such as energy usage, energy price, and so forth, can be shared among the devices. As well, HAN appliances can be controlled from a host terminal when such functionality exists. HAN appliances are smart appliances and may also be configured with Zigbee, WLAN, WiFi, etc., communication capability.

Home Energy Management System Background

Home energy management systems have been found to benefit homeowners by providing energy saving measures through usage information feedback and analysis. The home energy management system may become more valuable as energy price increases and as time-of-use (TOU) pricing is implemented. Thus, detailed information may be important in providing quantitative energy saving measures, changing consumer behavior, and diagnosing the efficiency of electricity usage.

Some current approaches for obtaining such detailed information about home energy usage include a full-instrumentation approach. By the full-instrumentation approach, whole houses, individual appliances, and/or wall outlets are instrumented and connected to a home area network to collect point-of-usage data.

Some pros and cons to the full-instrumentation approach are as follows:

Pro: accurate, automatic control capability.

Con: expensive, e.g. >=$300 per house, extensive installation or retrofit required.

That is, the full-instrumentation approach has been found to be too expensive for many home owners and that pay-back may take longer than 10 years. Thus, a low cost home energy management system may be a key in opening up a mass home energy management market.

Some current companies on the market providing home area network solutions and/or HAN devices/solutions include Control4, iControl, Tendril and EnergyHub. OPOWER, Arlington, Va. and Google PowerMeter by Google organize meter-level electricity data and provide visualizations with limited analysis.

M. R. Durling; Z. Ren, N. Visnevski, and L. E. Ray, Cognitive electric power meter, U.S. Pat. No. 7,693,670 (Apr. 6, 2010) disclose a transient pattern recognition approach to recognize an electric load, embedded in the meter itself. However, certain limitations of such approach are as follows, in no particular order:

- With transient recognition, an electric load can be 'detected'. However, its power consumption is difficult to estimate, unless power consumption is constant right after the turn-on transient.
- Faster sampling, e.g. greater than or equal to 1 Hz, is required to recognize a transient pattern, implying this type of algorithm can not be run with meter level data as most meter chips output power data at approximately 1 Hz internally. Instead, a new type of meter is required that can run the algorithm at chip level because current smart meters can not run this type of algorithm.
- It requires the cognition capability to be embedded as it requires high sampling.
- Transient pattern recognition requires all possible pattern exemplars to be preloaded to meter memory. The number of required pattern exemplars can be prohibitively enormous, as different appliances, different makers/models and different usage create different transient patterns. Also, an exemplar pattern collected in a laboratory environment will be different from a home where an appliance is subject to different usage and aging conditions. Transmission characteristics also play a role in creating a transient pattern in a high frequency sampling environment.

SUMMARY OF THE INVENTION

A method and apparatus are provided for a home energy management platform. The platform includes using a power sensor, such as a smart meter for example, as a whole house power sensor or subset thereof. Data from the power sensor are analyzed using advanced statistical and machine learning techniques for extracting detailed usage information and for generating specific energy saving measures, among other relevant information. In an embodiment, a gateway console is provided that has various communication capabilities, including, but not limited to, Zigbee, WLAN, WiFi, and the Ethernet. The gateway console may communicate with and may control HAN devices. The gateway console may collect data from the power sensor as well as from HAN devices and may upload such collected data to servers for the analysis processing, among other processing. Certain amounts of data processing and analysis may be performed at the local level, such as at the power sensor, other HAN device, and/or the gateway console. Some types of the data processing and analysis that may be performed at the local level include performing feature extraction and load recognition/matching.

The platform may provide information to the user via various interfaces, such as web, mobile, email, mail, phone call, etc.

BRIEF DESCRIPTION OF THE DRAWINGS

FIG. 3 shows in graph form an example of the power signal over M samples for the period j−1 and over N samples for the period j, according to an embodiment;

DETAILED DESCRIPTION OF THE INVENTION

Overview

Figure 1:
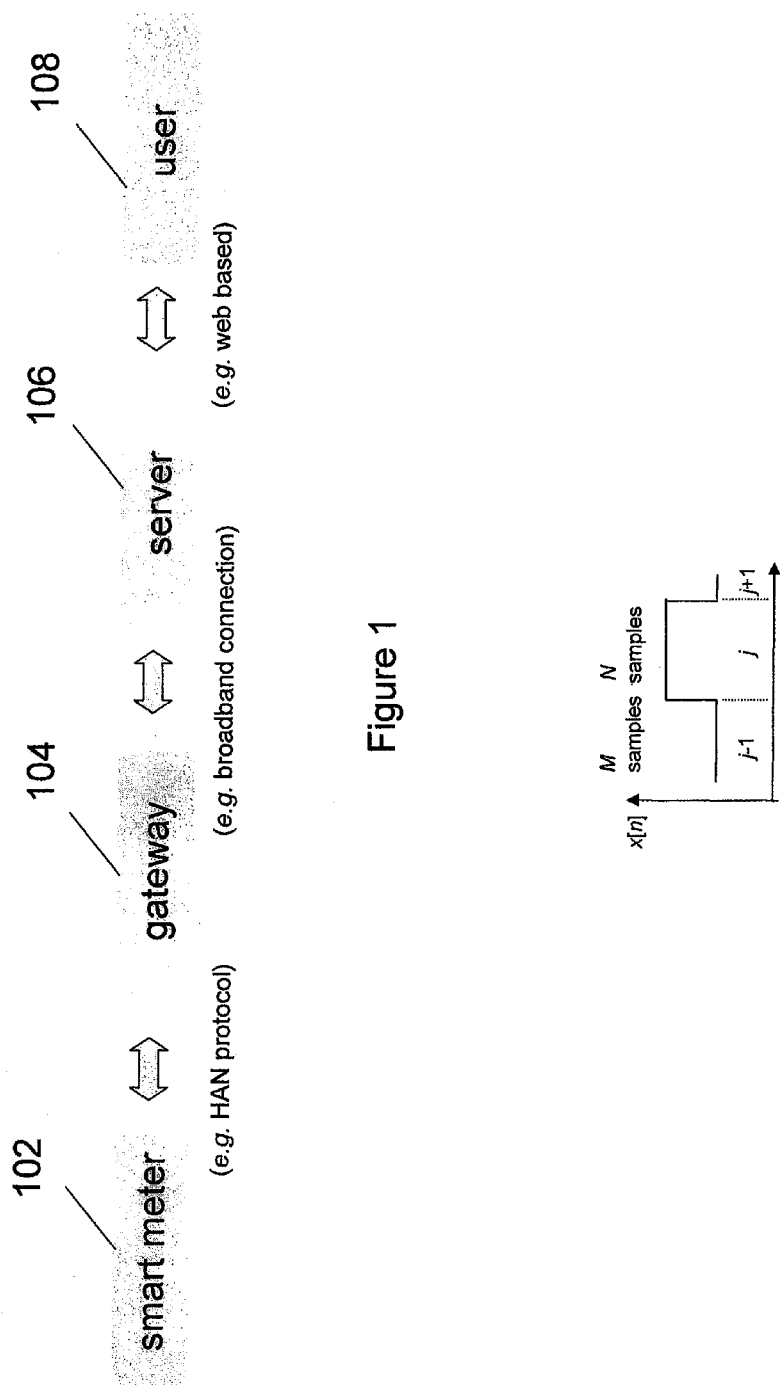
FIG. 1 is a schematic diagram showing main components of a home energy management system at a high level, according to an embodiment.

A method and apparatus are provided for a home energy management platform. The platform includes using a power sensor, such as a smart meter for example, as a whole house power sensor or subset thereof. Data from the power sensor are analyzed using advanced statistical and machine learning techniques for extracting detailed usage information and for generating specific energy saving measures, among other relevant information. In an embodiment, a gateway console is provided that has various communication capabilities, including, but not limited to, Zigbee, WLAN, WiFi, and the Ethernet. The gateway console may communicate with and may control HAN devices. The gateway console may collect data from the power sensor as well as from HAN devices and may upload such collected data to servers for the analysis processing, among other processing. Certain amounts of data processing and analysis may be performed at the local level, such as at the power sensor, other HAN device, and/or the gateway console. Some types of the data processing and analysis that may be performed at the local level include performing feature extraction and load recognition/matching. The platform may provide information to the user via various interfaces, such as web, mobile, email, mail, phone call, etc.

It should be appreciated that regarding other approaches using transient recognition where an electric load can be 'detected' and that its power consumption is difficult to estimate unless power consumption is constant right after the turn-on transient, an embodiment is provided herein that overcomes this issue. More particularly, an embodiment is provided herein that overcomes this issue by recognizing the whole power usage pattern throughout the turn-on cycle of an electric load.

It should be appreciated that regarding other approaches where faster sampling, e.g. greater than or equal to 1 Hz, is required to recognize a transient pattern, this type of algorithm cannot be run with meter level data as most meter chips output power data at approximately 1 Hz internally. In contrast, an embodiment is provided herein that can work with meter level power data less than or equal to 1 Hz and can be embedded into the current generation of smart meters with a firmware upgrade, if necessary.

It should be appreciated that regarding other approaches where the cognition capability is required to be embedded as it requires high sampling, in contrast an embodiment is provided herein that can either be embedded or can be run remotely/off-line with meter data.

It should be appreciated that regarding other approaches where transient pattern recognition requires all possible pattern exemplars to be preloaded to meter memory, the number of required pattern exemplars can be prohibitively enormous, as different appliances, different makers/models and different usage create different transient patterns, an exemplar pattern collected in a laboratory environment will be different from a home where an appliance is subject to different usage and aging conditions, and transmission characteristics also play a role in creating a transient pattern in a high frequency sampling environment, in contrast, an embodiment is provided herein that utilizes a few generic models per appliance and lets the models learn its parameters (iteratively and/or continuously) from specific instances recognized from each home.

An embodiment can be understood with reference to FIG. 1, a schematic diagram showing main components of a home energy management system at a high level. It should be appreciated that discussion herein may center on electricity power being the utility consumed. However, electricity is by way of example only and is not meant to be limiting. Other types of energy consumption and utilities are contemplated, such as water and gas and the like. As well, discussions herein may refer to smart meters as particular power sensors that measure whole house electric loads or a subset thereof. However, a smart meter is by way of example only and is not meant to be limiting.

A smart meter 102 is used as a whole house power sensor. A gateway console 104 is configured for collecting power-related data from smart meter 102, and for uploading, e.g. over a broadband connection, such data to a server 106. It should be appreciated that broadband connection is by way of example only is not meant to be limiting. Communication flow can take other mediums, too. For example, other mediums include telephone modem and power line communication, instead of broadband.

In an embodiment, gateway console is configured for being in communication with smart appliances, such as smart appliances, as well (not shown). For example, in an embodiment, gateway console 104 collects power data according to a home area network (HAN) protocol from smart meter 102 or HAN appliances.

At server 106, the data is analyzed using advanced statistical and machine learning techniques for extracting detailed usage information and for generating specific energy saving measures. In another embodiment, the analysis function is embedded in the smart meter itself and the information can be pulled out through the utility communication network. That is, according to an embodiment, the meter embedding approach is as follows:

Meter (local level processing/analysis)→utility network→server (more processing/analysis)→user Information is extracted from raw power data at the meter level, such that the amount of data to be transmitted through utility network is reduced, compared with transmitting whole raw data. The server may do more processing/analysis based on the amount of work done at meter level.

Thus, because present utility communication bandwidth is too small to efficiently transmit whole raw power data, an embodiment provides the HAN approach or the meter embedding approach.

In an embodiment, the gateway console may send raw data to the server and the server may do both feature extraction and classification. In an embodiment, the sever may also get features from smart meters, or raw data directly from smart meters if there is enough bandwidth, either through a utility network or a third party network.

The detailed usage information, specific energy saving measures, and any other relevant data are made available to the user 108. For example, an embodiment enables user 108 to access the detailed usage information, specific energy saving measures, and any other relevant data on a web-based application. It should be appreciated that the web-based application is by way of example only and is not meant to be limiting. An embodiment enables user 108 to access the detailed usage information via other interfaces, such as mobile, email, mail, phone call, etc., as well.

In an embodiment, gateway console 104 communicates with smart meter 102 using any of power line, WLAN, and Zigbee-based protocols. In an embodiment, users purchase or receive gateway console 104, call the associated utility company, such as the electric company, and register gateway console 104. Thereafter, gateway console 104 is able to communicate with a particular, assigned smart meter, e.g. smart meter 102.

In an embodiment, gateway console 104 is equipped with a communication chip, such as Zigbee, and other HAN devices (not shown) are equipped with a communication device, such as a Zigbee chip. As well, gateway console 104 is registered such that gateway console 104 and the other HAN devices are in communication with each other. Thereafter, HAN appliances may update energy usage and status information, either locally, e.g. at the same HAN device, at smart meter 102, at gateway console 104, or to server 106. Based on the updates, a HAN device may follow an instruction, such as turn itself off. Gateway console 104, smart meter 102, and/or server 106 may send operation commands to one or more of the HAN appliances.

As well, in an embodiment, server 106 or smart meter 102, when each is appropriately configured, may send price signals to such gateway console 104 or HAN appliances. Thus, particular decisions can be made either at gateway console 104 or server 106, based on the price signal, usage of one or more particular appliances and analytics. Networked appliances, e.g. HAN appliances, can have autonomy to operate or not operate based on the price signal and user preference, when the networked appliances have enough intelligence. The platform is flexible, such that when a home has gateway console 104, i.e. a home controller, decisions may be made by the controller. In another embodiment, if the home does not have a controller, then appliances may communicate directly with smart meter 102, make decisions on their own, or may receive instructions from smart meter 102 when the meter is configured as a gateway/controller.

In an embodiment, gateway console 104 is configured to act as a site, e.g. home, enterprise, government, etc., resource operating system provider. The gateway may control/monitor various networked appliances, integrate renewable generation/storage of energy, such as solar and wind, provide security and home automation service, integrate home entertainment function, control how utilities, e.g. electricity, water, and gas are consumed, generated and stored, etc. Thus, in this way, gateway console 104 may provide integrated control, energy efficiency, and demand response service.

That is, the nature of basic energy management service may be based on load recognition/disaggregation, such as real time energy usage feedback, usage analysis, areas/appliances that can be targeted for energy saving, demand response participation items, time of use related energy saving tips, and so forth.

An Example Use Case Flow

An example use case flow is as follows. The gateway receives real time power usage from a smart meter and uploads the data to the server. Processes at the server analyze the uploaded power data and determine the presence of or start of a clothes dryer operation and an electric vehicle charging, both usages of which draw significant amount of electricity. If the time of day is such that the price of electricity is high, e.g. at peak hours or during a demand response period, the server may send an alert to users of the particular household to turn off those appliances. For example, the server can send a text message or an email alert to the users. In addition, if the gateway has the capability to control those appliances, the gateway may send a command to each of the appliances causing the appliances to stop or delay their operation until pricing is more favorable, based on user preference.

Example Results

Figure 2:
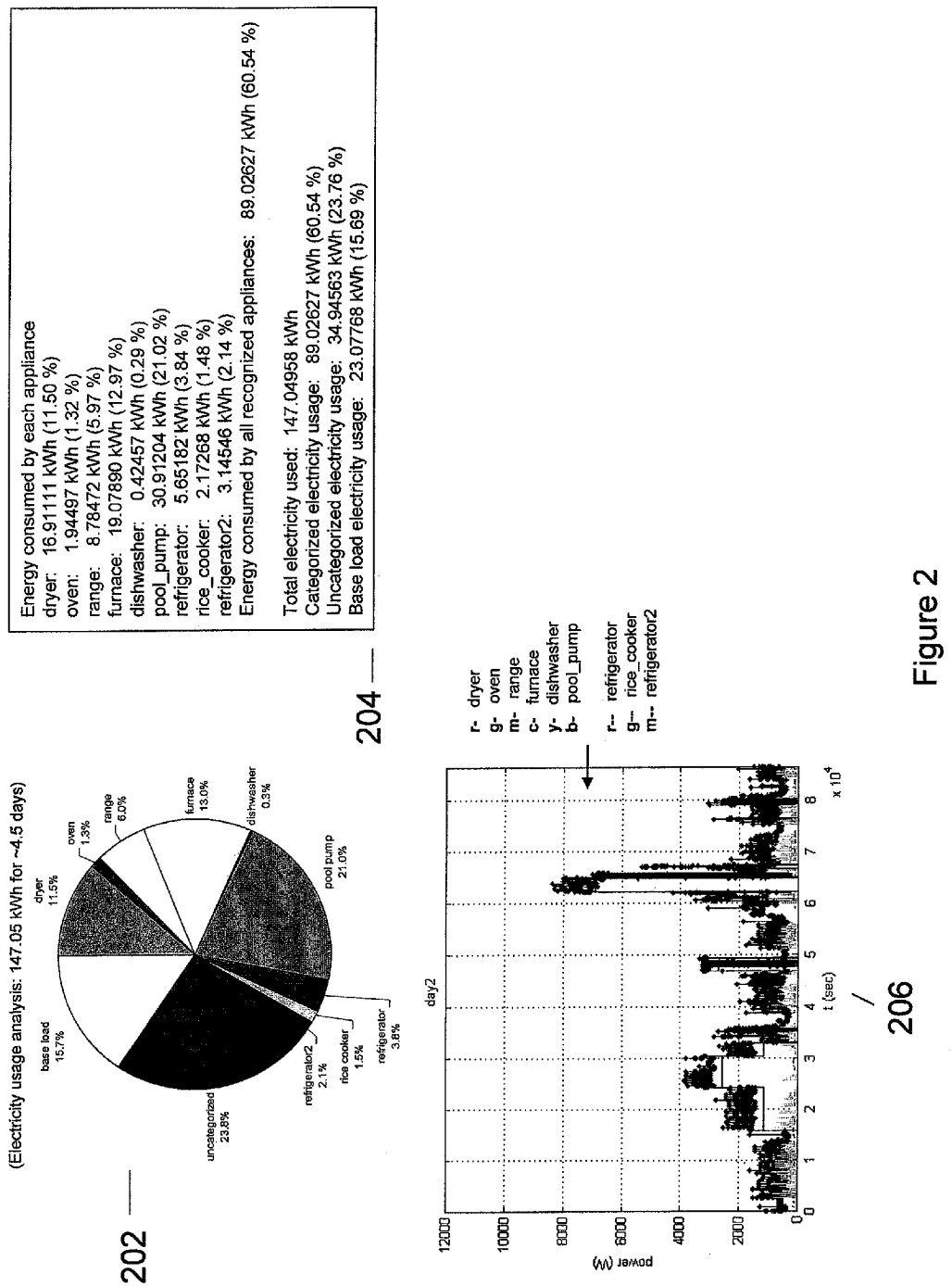
FIG. 2 is a schematic diagram showing three modes of illustrating energy usage by each appliance in a household, according to an embodiment.

Some results of analyzing the extracted power data of a home energy management system according to an embodiment can be understood with reference to FIG. 2. FIG. 2 is a schematic diagram showing three modes of illustrating energy usage by each appliance in a household, according to an embodiment. Specifically, a pie chart 202 shows the results of the analysis of total energy usage over approximately 4.5 days and 147.05 kWh. Pie chart 202 also shows the particular distribution over individual appliances. For example, pool pump usage is 21.6%, usage of electricity for things within the house that are not presently categorized (uncategorized) is 23.7%, and dryer usage is 11.5%.

A legend 204 presents the same information as in pie chart 202, but in list form. As well, legend 204 presents actual kWh usage along with the percentage use. For example, legend 204 shows base load electricity usage to be 23.07768 kWh, which is 15.69% of the total usage.

Also shown on FIG. 2 is a power-versus-time graph 206. In an embodiment, the graph is color-coded, such that each appliance is associated with a color. For example, the graph of the dryer's power usage is in red. The graph of the rice cooker is green. Thus, at a glance, a user can detect which appliances consume more energy, which consume less energy, and when and how long each appliance has been used.

Advanced Analytics Overview

An embodiment recognizes each appliance from whole home utility data and thus disaggregates whole home utility data, such as power data, into appliance level utility consumption. As well, utility usage, such as electricity usage, can be categorized into functional groups, e.g. laundry, cooking, heating, cooling, lighting, etc. In an embodiment, categorized energy consumption information is a basic building block in providing energy saving measures, along with weather, demographic and geographic data. By categorization, you can provide feedback about how homeowners are using energy efficiently and what kind of energy saving measures are possible. However, ideally determining appropriate feedback/energy saving measures should be performed in context. For example, using lots of air conditioning (AC) in a hot climate or on a warm day may make sense, but not for a house in a cooler climate or on a cloudy day. Also, using a lot of electricity for a washer and dryer may make sense for large households, but not for small households with only a few people. For example, the particular washer and dryer may be old and very inefficient. Thus, any feedback or suggestion should account for these types of example circumstances.

Examples of Energy Saving Measures

Most people would readily recognize that money can be saved by adjusting a thermostat setting by one degree. However, an embodiment enables a user to know how much money can be saved by the adjustment to the thermostat.

Similarly, a typical consumer of energy may want to know whether it makes sense to change to energy-efficient appliances and how long it would take to meet the break-even point. An embodiment enables a user to obtain the answers to the above-two questions.

Further, a typical consumer may want to know how much energy or cost can be saved by not using dryers during peak hours. An embodiment enables a user to determine how much energy or cost can be saved by not using dryers during peak hours.

Further, a typical consumer may want to know how much energy or cost can be saved if they reduce pool pump running hours by half. An embodiment enables a user to determine how much energy or cost can be saved when they reduce pool pump running hours by half.

Marketers Point of View

Demand response (DR) and time of use (TOU) pricing create an urgency/need for home energy management service. Meter unlocking, e.g. providing HAN accessibility, and low equipment cost, e.g. cheap gateway console, enables enterprises or utilities to provide the service at low cost. Demand response herein means that users either have to reduce electricity demand voluntarily or are forced to reduce electricity demand during a peak demand period. There may be financial incentives associated with demand reduction. TOU pricing refers to a tiered price structure where electricity is more expensive during high demand hours, while cheaper in a low demand period. TOU pricing is considered a permanent pricing structure to induce more even distribution of demand over the time periods and to reduce demand during peak hours. DR is considered a temporary measure, e.g. an emergency measure, to reduce demand when the electricity reserve falls below a certain threshold.

It should be appreciated that embodiments herein provide a foundation for energy informatics. More particularly, embodiments herein provide a foundation for energy informatics in the smart grid space, where the information may be used for energy efficiency improvement, energy conservation, demand response, resource planning and energy policy formation, and for the benefit of a consumer, utility, and government. As an example, an embodiment may provide an individual or collective appliance usage plot that may be overlaid with different TOU price curves to determine the best possible TOU scheme for users. Or, as another example, when a TOU scheme is fixed, different strategies for using appliances may be tested to determine the best possible operation cycle or plan.

Effective Customer Engagement

Effective customer engagement to promote behavioral change is important. In addition to embodiments herein providing detailed energy consumption information and specific energy saving measures, it is contemplated herein that following customer engagement methods may be used to maximize energy saving and to permanently reduce the customers' energy footprint as follows:

Comparing the customers' energy usage with average energy usage of similar sized households.

Assigning an 'energy fitness number' which is energy consumption normalized by household size, demographic information, geographic information and other factors. Similar to body weight, too high of a number may mean overconsumption or obesity and it needs to be lowered to a proper level by exercising energy saving measures. Too low of a number is not desirable, either. Too low of a number may be the sign of extreme austerity or the reflection of the customers' life style where they do most of energy consumption activities outside home. The fitness number is an objective measure to promote awareness among consumers and becomes a vehicle or target to achieve a healthy level of energy consumption. An entity may provide 'personal training service' by constant analysis, feedback, and energy saving exercise recommendations.

Introducing competition or gaming aspect to homeowners to promote further energy savings. For example, homeowners may be organized into peer groups and they can watch how well they are maintaining their energy fitness number within the group or compete to reach a target score in sustainable manner.

Certain credits may be tied to lowering the energy fitness score to a proper level. Carbon credit can be an example. These credits can have monetary value. These credits can be further financial incentive to homeowners to conserve, in addition to the direct cost saving from the energy conservation.

In an embodiment, an energy footprint per person, e, may be defined in the following manner:

$$e = \frac{C}{N} = \frac{\int_T E(t)S(t)\,dt}{N}$$

C is the cost of energy for a time period T. N is the number of persons in a household. E(t) is energy consumption at time t and S(t) is price of energy at time t. It should be appreciated that energy cost is used for computing the energy footprint, instead of using energy consumption, because using energy cost accounts for an assumption, e.g. a type of policy, that a person who tends to use more energy when the price is high, e.g. during a peak demand period, needs to have a higher energy footprint.

The energy fitness number, f, may be defined in the following manner:

$$f = e\prod_i n_i$$

e is the energy footprint as defined above. e is multiplied by products of normalization factors, $n_i$, to calculate f.

Normalization factors may include but are not limited to the following:

Number of households: Large households tend to have smaller e, as they share the overhead energy consumption and thus need to have higher normalization factors.

Domestic activity: As larger numbers of households spend larger fractions of their time at home, their e increase. Thus, there is a need to apply lower normalization factors for these households.

Geographic location/climate: Households located at a severe climate will use more energy for heating or cooling than those located in a mild climate. Thus, there is a need to apply lower normalization factors for these households.

Season: Even in a particular climate zone, there may be a seasonal variation in energy consumption, e.g. the energy bill may be higher in the winter than in fall. Thus, a seasonal normalization factor will filter out these variations.

Weather/temperature: On top of the long term seasonal variation, there may be a short term fluctuation in energy consumption due to extreme weather conditions, e.g. cold spells, an Indian summer, etc. Thus, a weather normalization factor filters out these short term variations due to weather change.

Energy price: The energy price tends to increase due to inflation and increasing cost of fuel and environmental abatement. Thus, a price normalization factor accounts for these changes and expresses f in a fixed energy price.

Thus, in an embodiment, f is a 'consumption energy fitness number.' In an embodiment, a 'life cycle energy fitness number', l, may additionally be defined that accounts for the environmental cost of power generation. Areas where higher ratio of electricity comes from fossil fuels may get a higher l. If home owners have their own renewable energy generation capability to meet part of their demand, they get a lower l.

In an embodiment, the energy fitness number or similar measures is used along with detailed energy usage information and energy saving recommendations to educate the consumers about the impacts of their energy usage and promote behavioral and psychological changes among such consumers. Such changes may permanently reduce the consumers' energy footprint to a healthy minimum, resulting in energy saving for the consumers, such as homeowners, and in the reduction of the socioeconomic and environmental cost of energy generation for society.

Electric Load Recognition from Centrally Monitored Power Signal

Overview

An embodiment of utility load recognition from a centrally monitored signal can be understood by the discussion hereinbelow. It should be appreciated that while the discussion is about electricity usage, it is by way of example only and is not meant to be limiting. Other types of energy usage, such as water and gas, for example, are contemplated as well. The same system and method may also be applied to other types of signals, such as physical, e.g. temperature, light intensity, etc., and socioeconomic data, e.g. commodity price, equity transaction volume, etc., to recognize patterns of interest present in the signal.

In one or more embodiments, any of the following may be true about the home energy management system and method:

The system/method can extract individual electric load usage information from a centrally monitored power meter signal.

The system/method can target residential electric load disaggregation/categorization from a smart meter signal.

The same approach can be applied to commercial and industrial electric loads.

The same approach, i.e. recognizing patterns of interest in the signal, can be applied to other types of signals, including gas and water utility.

The system/method assumes only real power is measured from a point of-entry location with a sampling interval larger than one second, e.g. no reactive or harmonic power and no faster sampling than one second.

The current approach works well with real power and a greater than one second (>1 sec) sampling interval, however such approach can accommodate changes in power dimension and sampling rate. The accuracy thus improves when reactive and/or harmonic powers are available and the sampling rate is increased.

The analytics processing can run on a local or central server with data collected from a power meter or can be embedded to run on the power meter itself.

Overall Structure

An embodiment provides the underlying structure for applying advanced analytics on contents of energy signals.

Feature extraction: An embodiment extracts features from the power signal, as required by the controlling mathematical model of the appliance.

Mathematical model of appliance/load electric behavior: (a) The model describes the behavior of appliance power consumption in a mathematical format. (b) The model determines what types of features are to be extracted from the power signal and what kind of classification algorithms are to be used.

Classification/search algorithm: The algorithm finds instances of appliances in the stream of extracted features.

Feature Extraction

An embodiment provides the following underlying functional structure for extracting predefined features from energy signals.

Attributes of the signal model, according to an embodiment, are as follows:

Discrete power signal from a load, e.g. electric, is considered as a statistically independent Gaussian random process.

Load i's signal is completely characterized by its mean and variance ($s_i[n] \sim N(\mu_i, \Lambda_i)$).

When k loads are on at time n, power signal x[n] is the sum of k individual random processes, e.g. as follows:

$$x[n] = \sum_{i=1}^{k} s_i[n]. \quad (a)$$

$$m_x = E(x[n]) = \sum_{i=1}^{k} E(s_i[n]) = \sum_{i=1}^{k} \mu_i \quad (b)$$

$$\Lambda_x = \sum_{i=1}^{k} \Lambda_i. \quad (c)$$

When another load p is on for the period of j, its mean and variance can be estimated as the maximum likelihood (ML) differences of signal means and variances, after and before the change.

ML mean and variance estimations are unbiased, and are good estimators when the sample population is large, as follows:

$$\hat{\mu}_p = \hat{\mu}_j - \hat{\mu}_{j-1}$$

$$\hat{\Lambda}_p = \hat{\Lambda}_j - \hat{\Lambda}_{j-1}$$

$$\hat{\mu}_j = \frac{1}{N} \sum_{n \in j} x[n], \hat{\mu}_{j-1} = \frac{1}{M} \sum_{n \in j-1}^{M} x[n]$$

$$\hat{\Lambda}_j = \frac{1}{N} \sum_{n \in j}^{N} (x[n] - \hat{\mu}_j)^2, \hat{\Lambda}_{j-1} = \frac{1}{M} \sum_{n \in j-1}^{M} (x[n] - \hat{\mu}_{j-1})^2$$

FIG. 3 shows in graph form the example above of the power signal over M samples for the period j−1 and over N samples for the period j.

A generic change-of-mean/variance detector can be used to divide an incoming power signal, i.e. time series, into segments of constant mean and variance. One example of a generic change-of-mean/variance detector can be found in Appendix A of the doctoral thesis of K. D. Lee, *Electric Load Information System based on Non-Intrusive Power Monitoring*, Department of Mechanical Engineering, Massachusetts Institute of Technology (June 2003), which is incorporated herein by this reference thereto.

Once changes of mean and variance at each segment boundary are detected, then such changes of mean and variance at each segment boundary are computed. The computed changes in turn are ML estimates of unknown electric load events.

Figure 4:
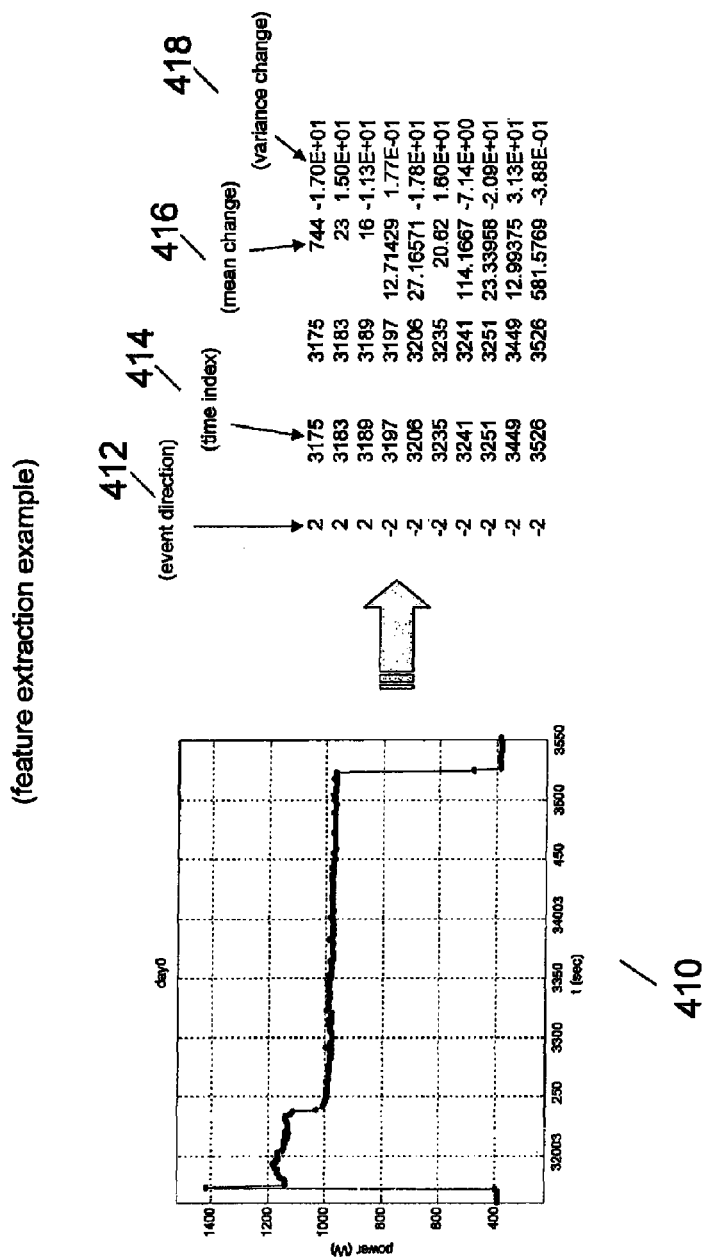
FIG. 4 shows a graph of sampled power data and a sample screen shot that displays the associated attributes of detected changes in the events extracted from the power data, according to an embodiment.

An example of such feature extraction can be understood with reference to FIG. 4. FIG. 4 shows a graph of power versus time for sampled power data 410. In an embodiment, such sampled power data is used to extract or detect features such as changes of mean and variance at segment boundaries. More particularly, for the sampled power data 410, an embodiment detects event direction data 412, time index 414, the mean change 416 at such time index, and the variance change 418 at such time index.

Mathematical Model of Appliances

An embodiment provides a mathematical model of appliances wherein the following is true:

The model is a finite state model with state probability and state transition probability. For an appliance with n state transitions, the overall probability is computed as a product of individual probabilities:

$$xi(\xi) = P(1 \rightarrow 2) * p(x|2) * P(2 \rightarrow 3) * p(x|3) * \ldots * P(n-1 \rightarrow n), \text{ where}$$

$p(x|k) = p(x_k|k) = p(\text{mean}_k|k) * p(\text{variance}_k|k) * p(\text{time}_k|k)$:
i.e. the kth state probability is the product of probability density functions of mean, variance, and time estimates, e.g. from feature extraction.

Figures 5, 6:
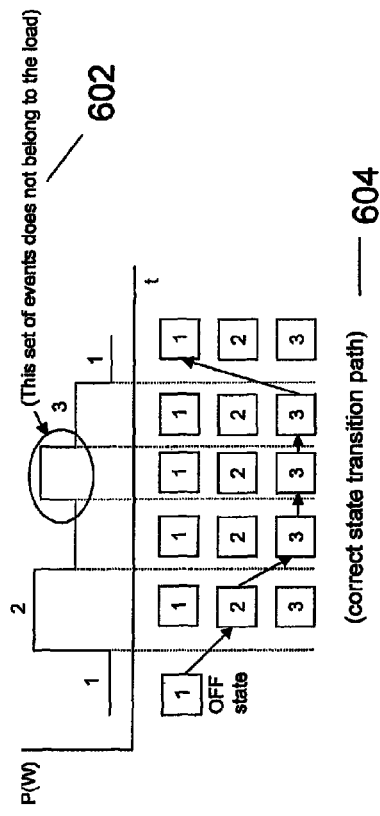
FIG. 5 is a schematic diagram of the Bayesian framework used for determining loads, according to an embodiment.
FIG. 6 is a schematic diagram showing a set of events for which the system and method determines such events do not belong to a particular load and for which the system and method replaces the detected change in state of such events back to unchanged, according to an embodiment.

It should be appreciated that the model is based on the Bayesian framework and can be understood with reference to FIG. 5:

For a given set of observations or load events ($x = [x_1 \, x_2 \ldots x_n]$) 502, the likelihood of load i with respect to observation x (xi) 504 is computed, assuming that the observations belong to load i.

A load, i.e. appliance, is selected that maximizes the posterior probability 508, which is the product of the likelihood of load i with respect to observation x 504 and the prior probability 506.

Load States

For an appliance with multiple components, the state of the appliance is expressed as a linear combination of the component states. As well, appliance states can be grouped to describe the behavior of appliance operation. For example, a series of several states can be grouped as a wash, drain, or dry group of a dishwasher. These groups can be used to explain the multiple cycles of wash and drain, followed by dry cycles of a typical dishwasher usage.

In an embodiment, load states are grouped to explain many possible behaviors of an appliance, depending on settings. For example, a washer may have agitate, pump and spin cycles. In a normal mode, the washer may repeat the agitate/pump/spin cycles twice. However if the user selects the second rinse button, the washer repeats the cycles three times. Certain washers do not have a distinct pump cycle and, thus, repeat the agitate and spin cycles only. Therefore, state grouping may be necessary to account for all these possible combinations of appliance usage.

In another example, a spin cycle may consist of the following states:
1. Short transient: where motor quickly accelerates.
2. ramp up: where motor does additional ramp up to full speed (with minor power increase).
3. spin: where motor adjusts to the full speed and fabric load stabilizes (indicated by minor power decrease).
4. steady-state 1: once water injection stops, spin load decreases (indicated by sudden reduction in power consumption).
5. steady-state 2: as spin progresses, less moisture remains in the fabric and the spin load gradually reduces (indicated by gradual reduction in power consumption).

These states are based on how electric component(s) of an appliance are physically used to accomplish its mission and the resulting power consumption behavior change of the appliance. In short, states are grouped based on their intended usage.

Classification/Search

An embodiment provides a classification or search algorithm with the following attributes or assumptions. When computing the likelihood for an appliance/load, an event may or may not belong to the appliance. In an embodiment, at each possible state transition, there is a null hypothesis that the event does not belong to the load and the state of the appliance is corrected to remain unchanged. An example of detecting a set of events which do not belong to an appliance can be understood with reference to FIG. 6. FIG. 6 is a schematic diagram showing a set of events for which the system and method determines such events do not belong to a particular load 602 and for which the system and method replaces the detected change in state of such events back to three (3), i.e. unchanged from the state of the previous set of events, to result in a correct state transition path 604.

In this case, with 3 appliance states and 5 events, there are $3^5$=243 possible state transition sequences. It should be appreciated that the number of possible state transition sequences can increase dramatically with increasing number of states and events. In general, with m states and n events, there exist $m^n$ possible state transition sequences. However, large numbers of state transition sequence candidates are eliminated during the search that have zero (or close to zero) state or state transition probability.

Classification/Search Algorithm

Figure 7:
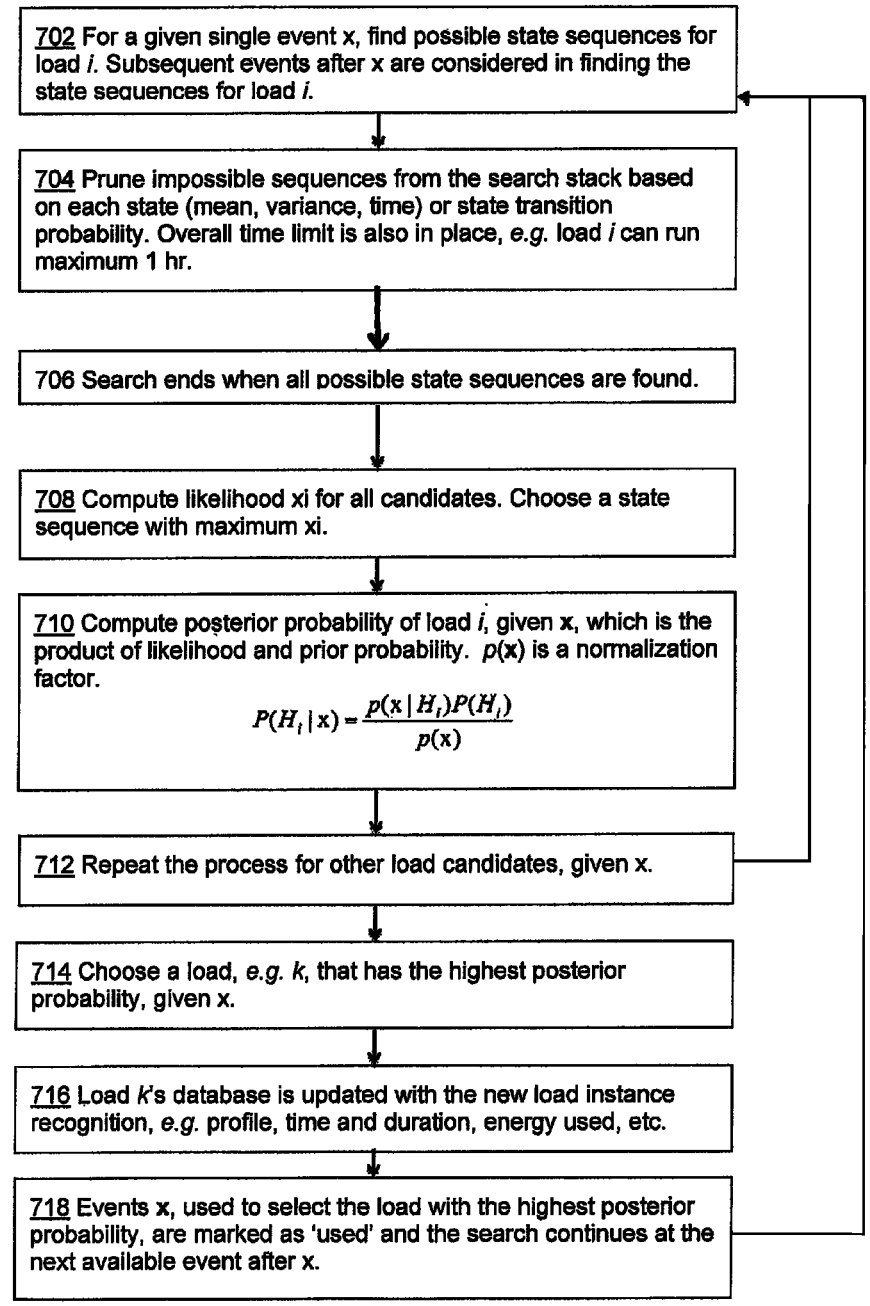
FIG. 7 is a flow diagram of a classification/search algorithm, according to an embodiment.

Following is a classification/search algorithm in accordance with an embodiment. The algorithm can be understood with reference to FIG. 7. For a given single event x, find possible state transition sequences for load i (702). It should be appreciated that subsequent events after x are considered in finding the state transition sequences for a given load, i. Prune impossible state transition sequences from the particular search stack, based on each state, such as mean, variance, and time probability, or based on state transition probability (704). It should be appreciated that an overall time limit is also taken into consideration, e.g. that load i can run for a maximum of one hour. The search for all possible state transition sequences ends when all possible state transition sequences are found (706). After all possible state transition sequences for a given single event x are found, compute the likelihood, xi, for all state transition sequence candidates for the particular load, i (708). After the likelihood, xi, for all candidates is computed, choose a state transition sequence with maximum xi (708). Compute posterior probability of load i, as shown in FIG. 5, for a given x, wherein the posterior probability of load i is the product of likelihood and prior probability as shown below (710). It should be appreciated that p(x) is a normalization factor.

$$P(H_i \mid x) = \frac{p(x \mid H_i)P(H_i)}{p(x)}$$

Repeat the process for other load candidates, given x (712), e.g. for loads k, l, and m. Choose a load, e.g. k, that has the highest posterior probability, given x (714). Update load k's database with the newly determined load instance recognition data (716), e.g. mean, variance, and time estimation of each state. By connecting the mean (power) value of each state at each state time boundary, the (power) profile of the instance of load k and its energy usage for the current instance can be obtained. Events x, used to select the load with the highest posterior probability, are marked as 'used' and the search continues at the next available event after x (718).

An Exemplary Program Flow (Batch Mode)

Overview

A batch mode is an iterative mode, while the continuous or real time mode may be considered as a slow motion execution of the batch mode as subsequent events necessary for full load recognition are not available yet. It should be appreciated that key novel aspects herein, such as the appliance/signal model and the corresponding feature extraction and classification/search algorithms to find instances from features based on the model, are readily provided in the batch mode. In batch mode, initial state and state transition probability estimates are given as starting points. Their estimates are updated from the statistics of the load instance populations at the end of each iteration. For example, if the state probability is modeled as Gaussian, then an embodiment may compute the average and sample variance of load instances, which are estimates of the true mean and variance of state probability. Gaussian or normal distribution may be considered completely characterized by mean and variance. The iteration ends when there are no changes in load instances and hence no change in probability estimates. The estimates from the batch mode may be used as state and state transition probabilities for the continuous mode. As there is no iteration in the continuous mode, the probability estimates are updated after the recognition of a new instance, by adding the instance to the population and recalculating the statistics.

Embodiments

An embodiment provides a program flow in which the classification/search algorithm for recognizing appliances, i.e. loads, within a particular signal, i.e. events x, described hereinabove is used. It should be appreciated that other algorithms for recognizing particular loads for events can be contemplated and that the particular classification/search algorithm referred to hereinbelow is by way of example and is not meant to be limiting. Other types of pattern recognition algorithms may include neural network, wavelet analysis, spectral analysis, transient analysis, support vector machine (SVM), etc. Certain optimization algorithms can also be used for load disaggregation, such as least residue, integer programming, genetic algorithm, etc. For loads that have sensitivity to other parameters, e.g. HVAC loads with temperature, certain correlation techniques, e.g. regression, may be used to estimate their energy consumption from the whole building energy usage.

Figure 8:
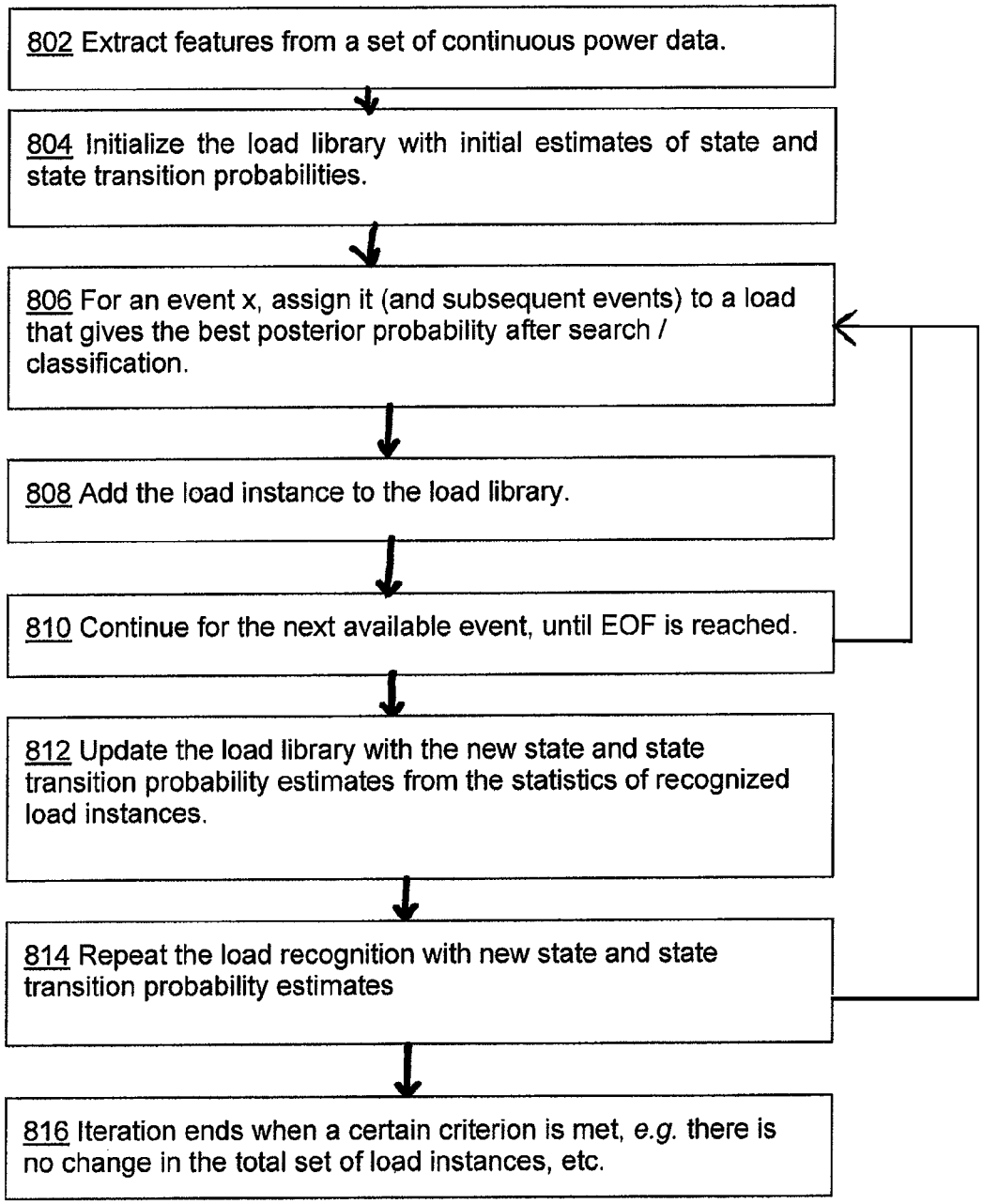
FIG. 8 is a flow diagram showing steps of a program flow in batch mode, according to an embodiment.

An embodiment can be understood with reference to FIG. 8. FIG. 8 is a flow diagram showing steps of a program flow in batch mode, according to an embodiment. Extract features from a set of continuous power data (802). Initialize the load library with initial estimates of state and state transition probabilities (804). For an event x from the power data, assign it and subsequent events to a particular load that gives the best posterior probability after search/classification (806). Add the load instance to the load library (808) as a recognized load. Each load instance is added to the library of a specific appliance assigned by the classification algorithm. The load library of each appliance contains the whole population of instances. These instances are used to update state and state transition probability estimates at the end, right before the next iteration. Continue for the next available event x, until EOF is reached (810). Update the load library with the new state and state transition probability estimates from the statistics of recognized load instances, and clear the current instances for the next iteration, unless it is a last iteration (812). Repeat/Iterate the load recognition with the new state and state transition probability estimates. (814) and return to step (806). Iteration ends when a particular criterion is met, e.g. until there is no change in the total set of load instances (816).

An Exemplary Program Flow (Continuous Mode)

Figure 9:
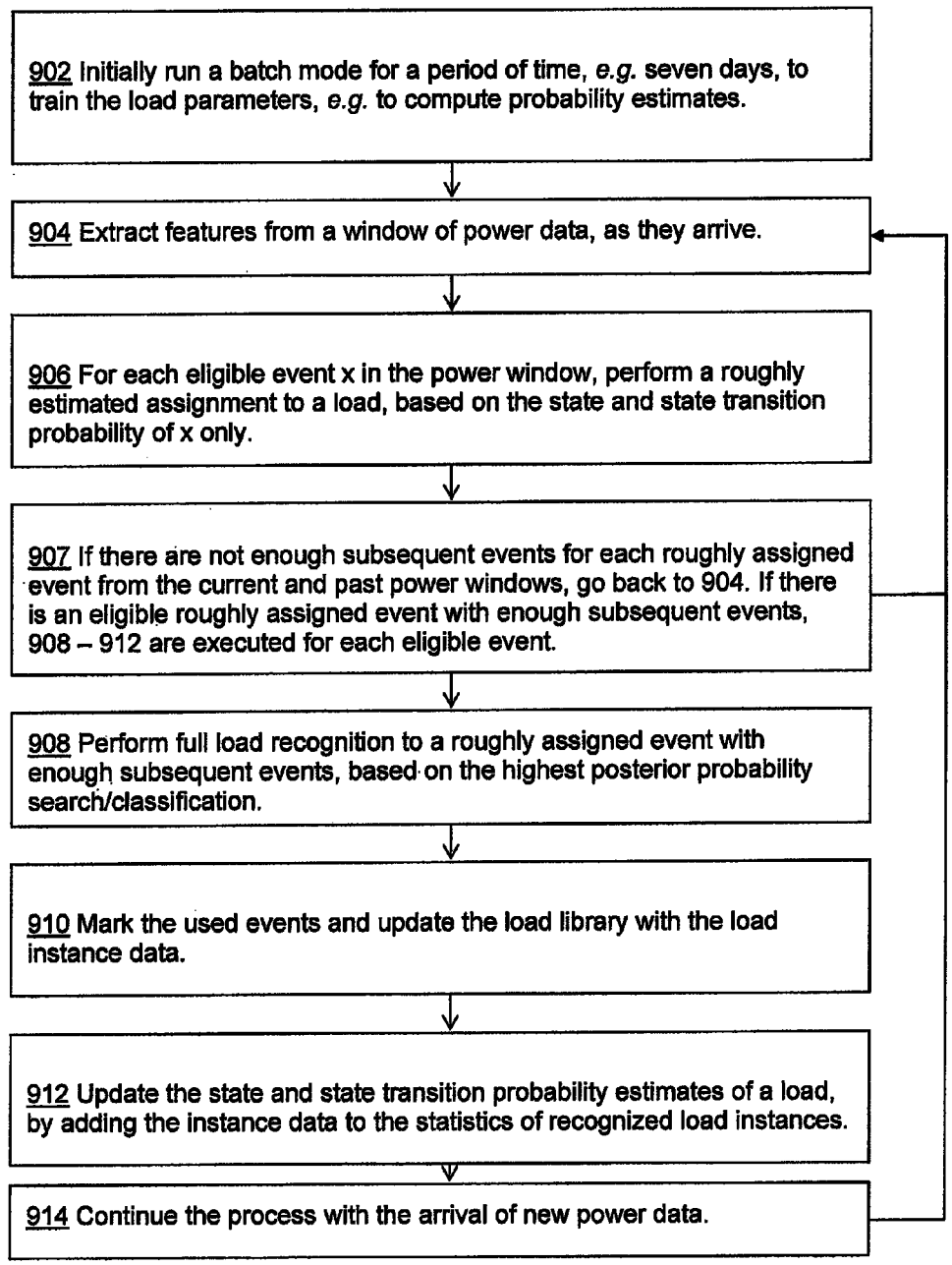
FIG. 9 is a flow diagram showing steps of such program flow in continuous mode, according to an embodiment.

Following is a description of a program flow in continuous mode, according to an embodiment. Such embodiment can be understood with reference to FIG. 9. FIG. 9 is a flow diagram showing steps of such program flow, according to an embodiment. It should be appreciated that other algorithms for recognizing particular loads for events can be contemplated and that the particular classification/search algorithm referred to hereinbelow is by way of example and is not meant to be limiting.

Initially a batch mode is run for a period of data, e.g. for approximately seven days, to train the load parameters or, in other words, to compute load probability estimates (902). Extract features from a window of power data, as they come in (904). For each eligible event x in the power window, perform a roughly estimated assignment to a load, based on the state and state transition probabilities of x only (906). If there are not enough subsequent events for each roughly assigned event from the current and past power windows, go back to step 904 (907). If there is an eligible roughly assigned event with enough subsequent events, steps 908-912 are executed for each eligible event and control returns to 904. Perform full load recognition to a roughly assigned event with enough subsequent events, based on the highest posterior probability search/classification (908). Mark the used events and update the load library with the load instance data (910). As well, update the parameters, i.e. the state and state transition probability estimates of the load, by adding the instance data to the statistics of recognized load instances (912). Continue the process with the arrival of new power data (914) and return to step 904.

It should be appreciated that in an embodiment, rough recognition is computed based on a single event in real time, because there maybe a need to let users know immediately that a specific appliance has just turned on, rather than waiting 30 min or an hour until the appliance turns off (which is when the embodiment has necessary subsequent events to do full load recognition). In an embodiment, initial probability estimates are used only at the beginning in the continuous mode, as probability estimates are constantly updated with the recognition of new load instances.

It should further be appreciated that the process waits until enough number of subsequent events are accumulated to do full load recognition. In an embodiment, the wait can actually be time based. For example, if an appliance has a time limit of one hour for each operation cycle, the process may wait one hour and use the initial event and all the subsequent events from the past one hour for classification/search.

Examples Graphs of Individual Appliances

Recognizing particular appliance events from a particular sample power data can be understood with reference to the figures hereinbelow. That is, each appliance can be shown individually as in the examples which follow.

Figure 10:
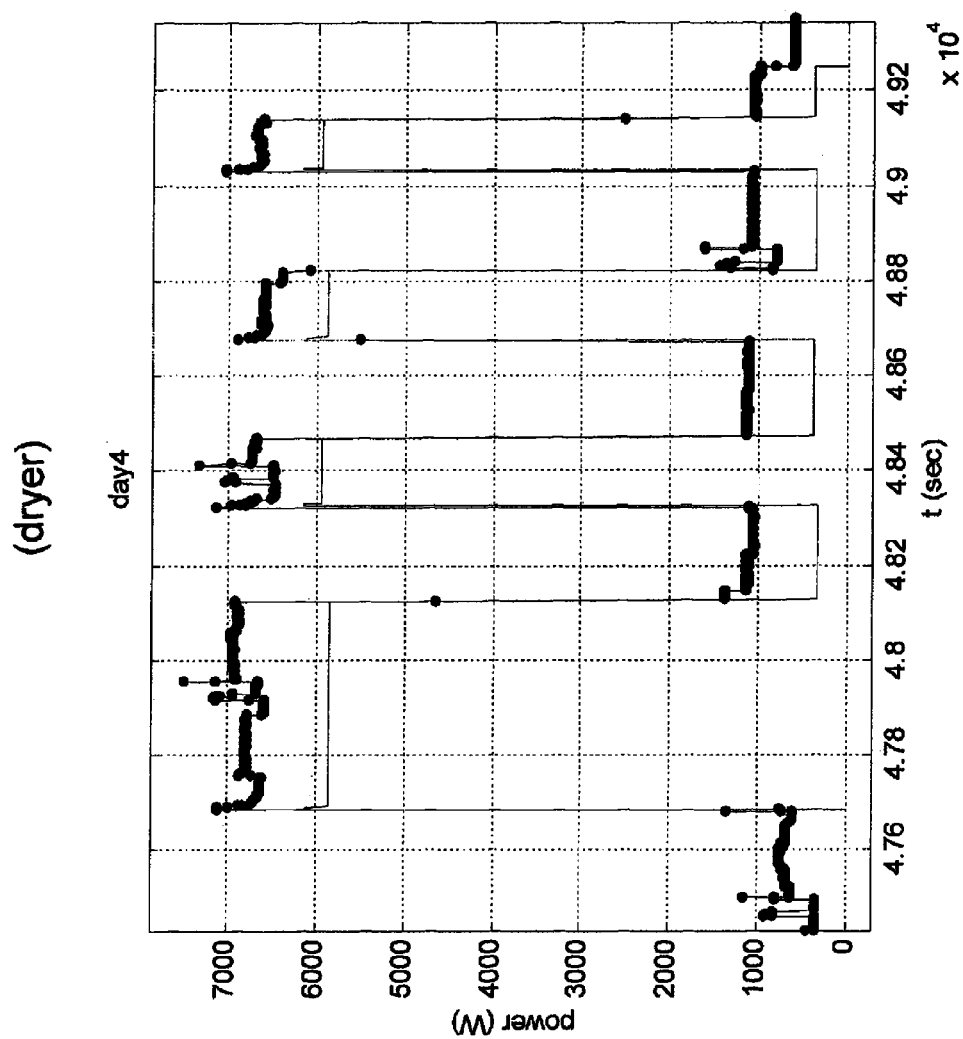
FIG. 10 shows how heater element events and motor events from clothes dryer are detected, according to an embodiment.

For example, FIG. 10 shows how dryer events are easily recognized from sampled power data on day 4. Such example is a structured classification example, i.e. where the system and method has prior knowledge of electric loads.

Figure 11:
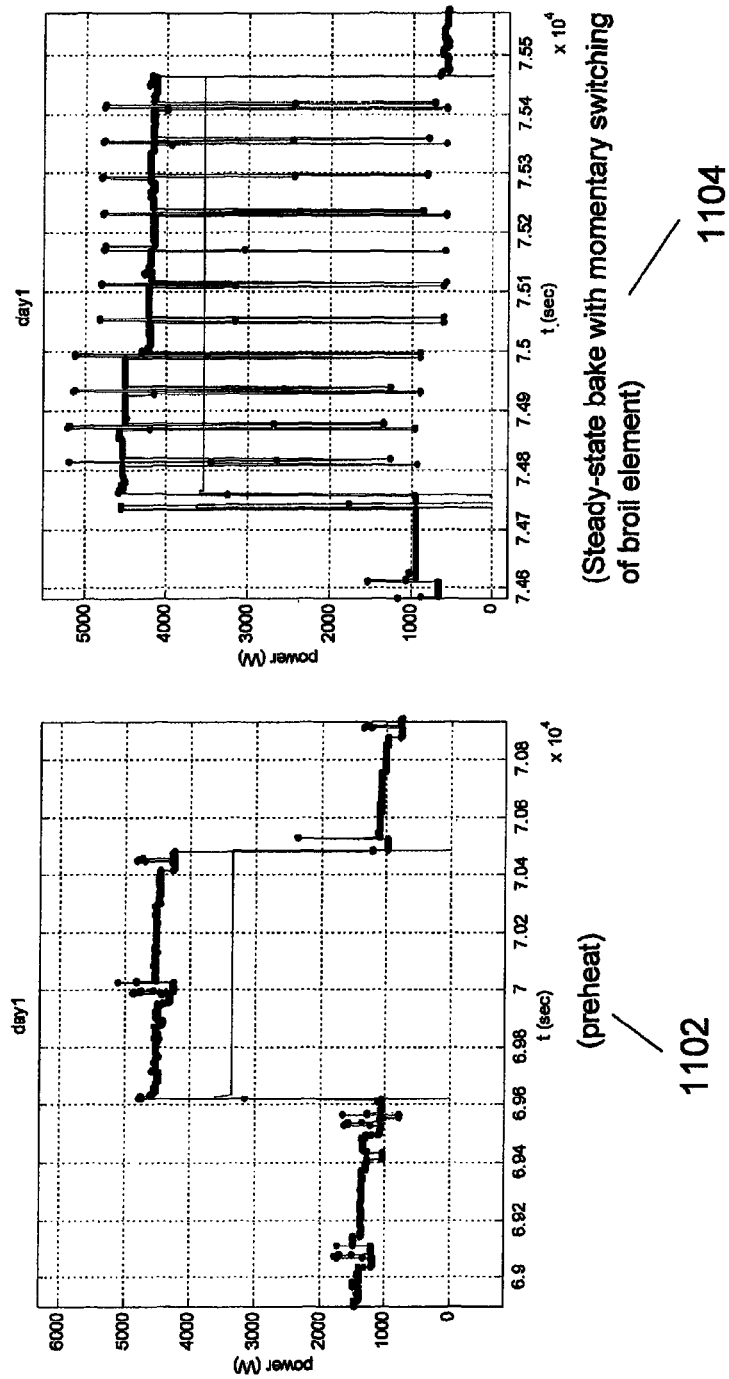
FIG. 11 contains two graphs, each of which shows events for an oven, according to an embodiment.

FIG. 11 contains two graphs, each of which shows events for an oven. The first graph shows consumed electricity over time in which a preheat event 1102 is easily recognized. The second graph shows a bake mode for the same oven. During the bake mode, a bake element momentarily turns off and a broil element momentarily turns on 1104, possibly for more uniform heating of the oven interior, while preventing turning on both the bake and broil elements at the same time.

Figure 12:
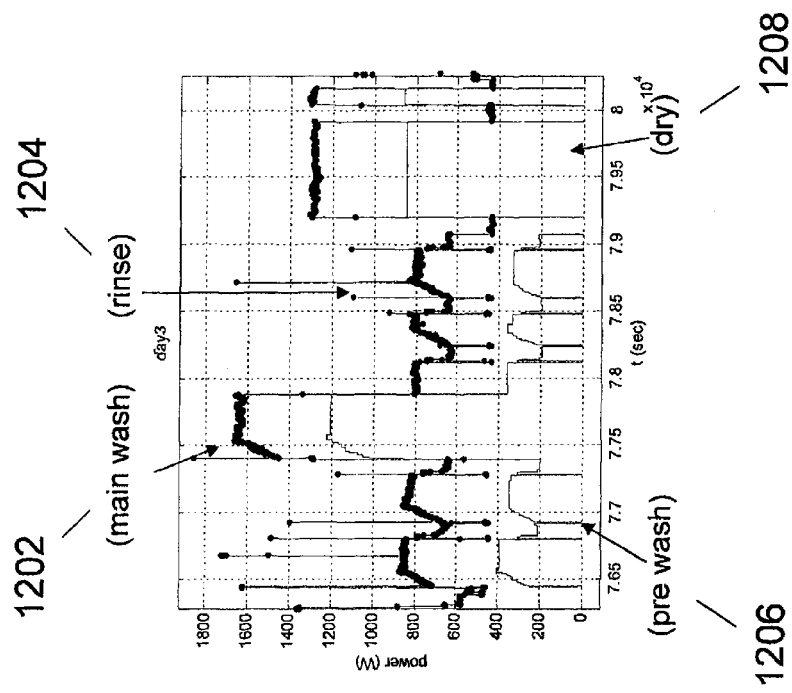
FIG. 12 is a graph for a dishwasher appliance during a period of time in which four functional cycles are detected, according to an embodiment.
Figure 13:
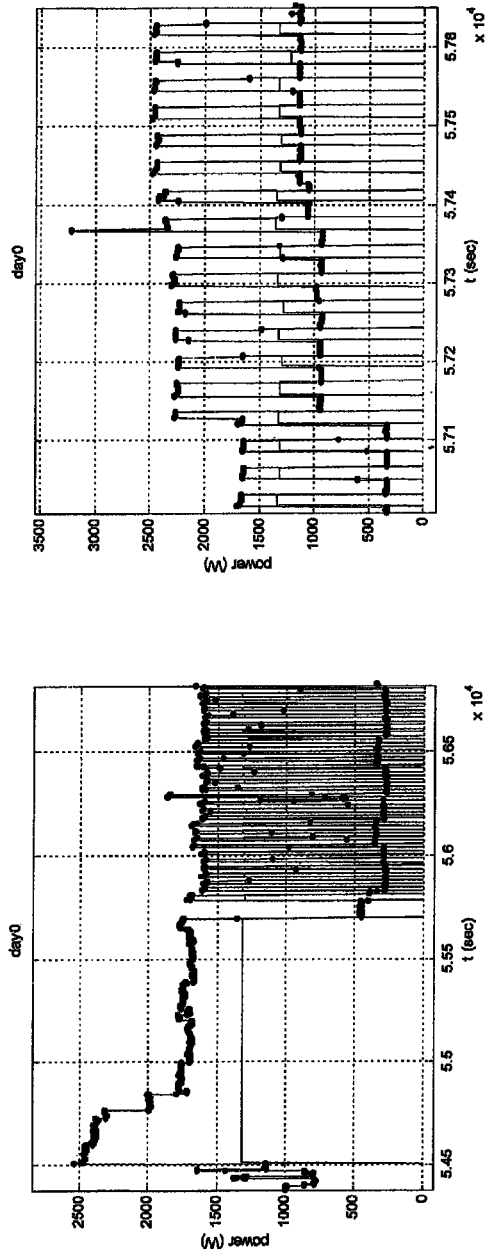
FIG. 13 is a graph showing how an electric range (small element) can be readily detected according to an embodiment.
Figure 14:
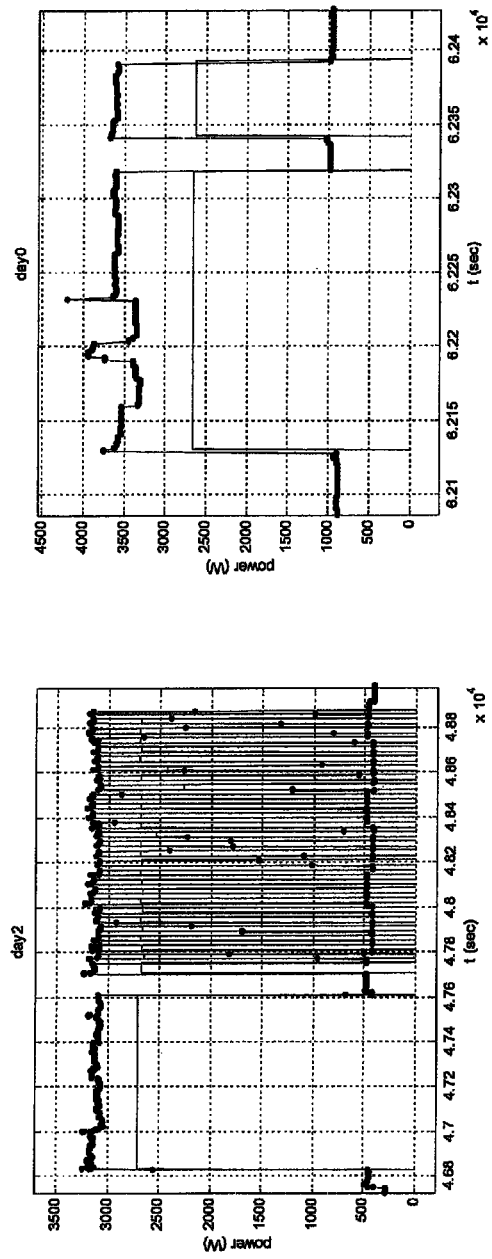
FIG. 14 is a graph showing how an electric range (large element) can be readily detected according to an embodiment.
Figure 15:
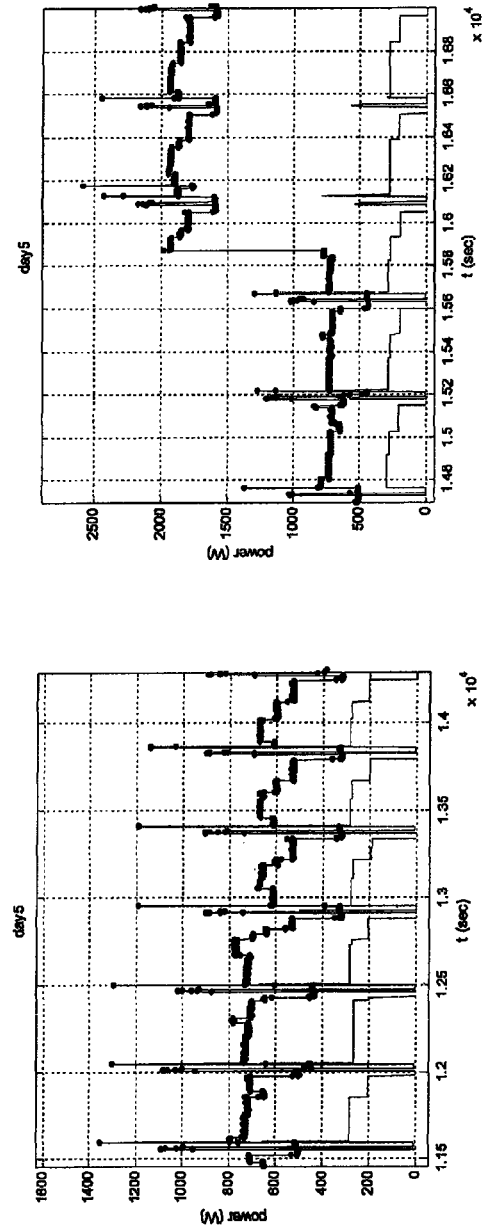
FIG. 15 is a graph showing how a furnace can be readily detected according to an embodiment.
Figure 16:
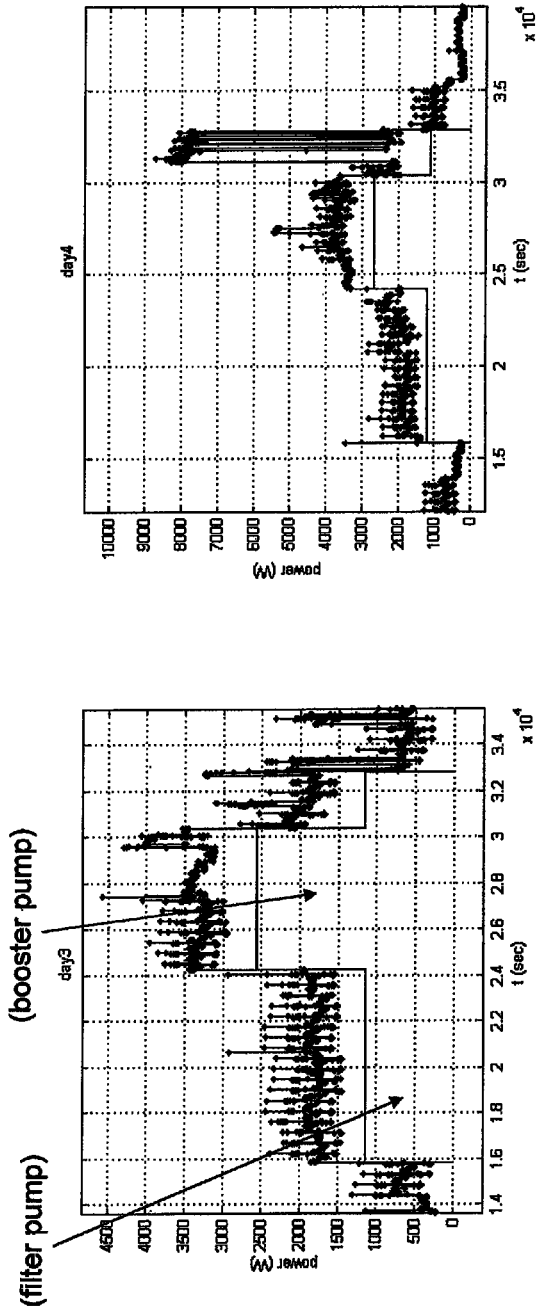
FIG. 16 is a graph showing how pool pumps can be readily detected according to an embodiment.
Figure 17:
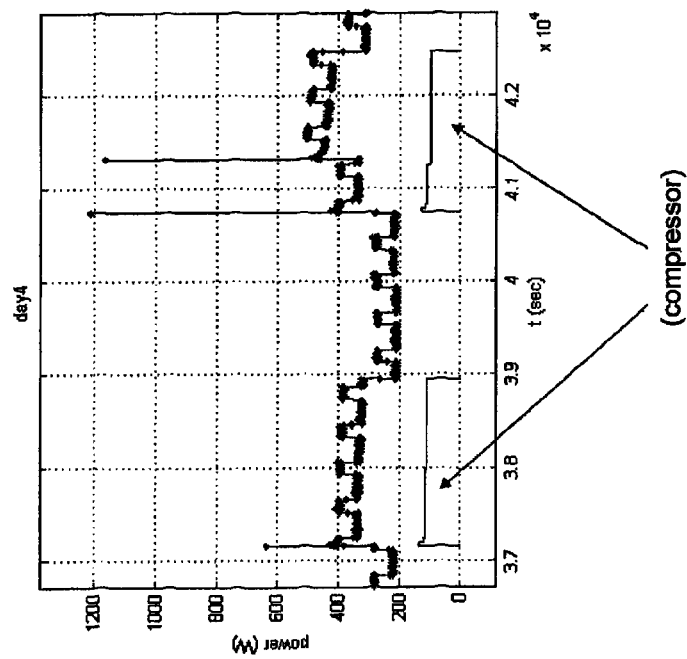
FIG. 17 is a graph showing how a refrigerator can be readily detected according to an embodiment.
Figure 18:
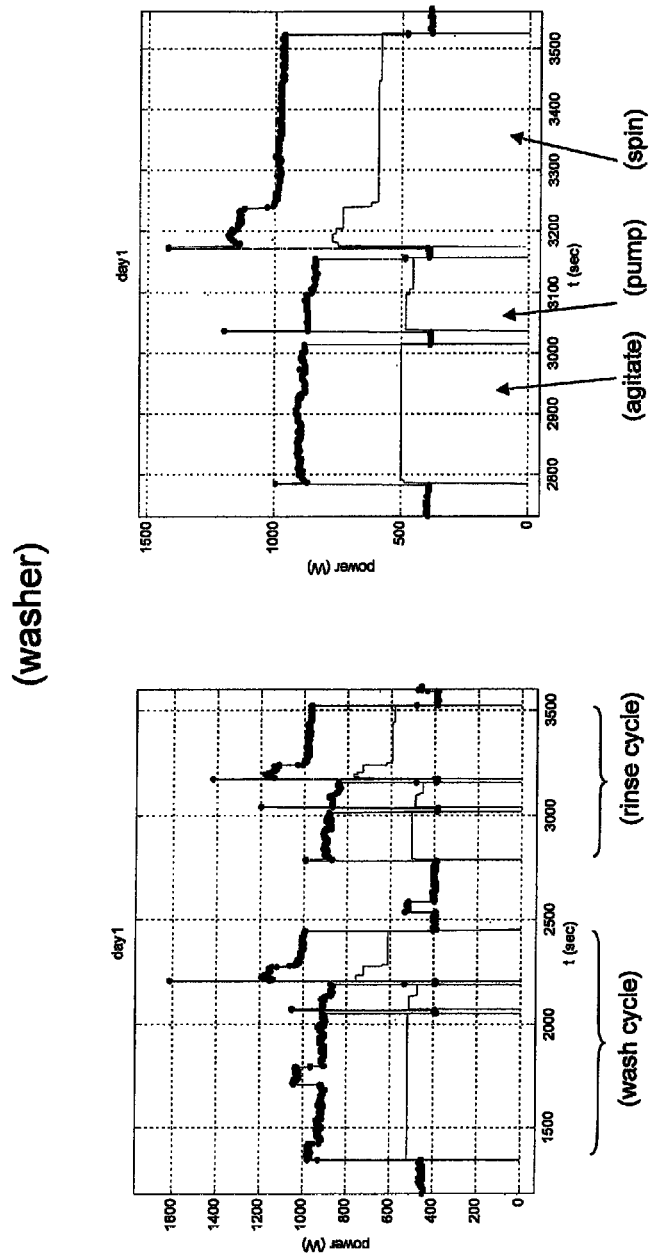
FIG. 18 is a graph showing how a washer can be readily detected according to an embodiment.

FIG. 12 shows a graph for a dishwasher appliance during a period of time in which four operational cycles are detected. The four operational cycles, pre-wash 1206, main wash 1202, rinse 1204, and dry 1208 are readily detected according to an embodiment.

FIGS. 13 through 18 show the appliances, Electric range (small element), Electric range (large element), Furnace, Pool pumps, Refrigerator, and Washer, respectively, can be readily detected according to an embodiment.

It should be appreciated that the examples above are for illustrative purposes only and are not meant to be limiting. One skilled in the art would readily appreciate that a variety of appliance and appliance events can be presented in graph forms such as these.

Alternative Embodiments

The system and method provide alternative embodiments that may include additional techniques to be used in conjunction with embodiments described hereinabove. Such alternative embodiments may improve accuracy and overall percentage of the categorization.

Specifically, alternative embodiments may include:
Using low time resolution data to aid search, e.g. such low time resolution enables pinpointing where within the data to look for specific on/off events.
Disaggregating left-over power, i.e. uncategorized power after classification/search.
Disaggregating electricity usage by using correlation to other variables, such as weather, demographic information, etc.
Roughly disaggregating by using low time resolution data, such as for example 6 sec, 1 min, 15 min, etc.
It should be appreciated that such disaggregating may require different approaches such as using basis decomposition, synthesis from known load profiles, etc.
Performing unstructured classification, for example by using particular load instances from structured classification as class templates.
Applying error correction, for example when certain portions of events are corrupted.
Such error correction may use an embodiment of the pattern recognition approach to find missed instances due to signal corruption. For example, a load instance, e.g. an average load instance, from the load library of an appliance may be used as a pattern template to match series of events that failed to be classified, e.g. due to signal corruption. A certain criterion, e.g. the minimum squared error between the template and observational data, may be used to find the best match between an observation and possible templates. Methods, such as least squares, may be employed to compute the best possible match. Section 3.7 of K. D. Lee's thesis mentioned above is an example of pattern matching using template(s).
Handling overlapped events.
May combine load models to account for the observation.
May use pattern recognition approach to find a good match for the observation with synthesis of load instances. Suppose appliance A and appliance B turn on almost at the same time. These events are overlapped and the current classification method may fail. In an embodiment, template instances may be extracted from the load libraries of appliances A and B. Then, the embodiment can 'synthesize' a template by adding the template from appliance A and the one from appliance B. A similar approach as in the above paragraph may be used to match overlapped events with the candidates of synthesized templates. Section 4.4 of K. D. Lee's thesis mentioned above is an example of pattern matching with templates created from the combination of individual templates.

Linking to transient event detection/matching, if high frequency sampling is available, to improve the overall recognition/disaggregation accuracy.

Using simple pattern matching techniques, e.g. instead of using an appliance model, to find load instances. For example, the power usage pattern of an appliance may be recorded during training or in lab and can be used as a template to find a match in power signal.

Unstructured Classification

An embodiment provides techniques for provisioning unstructured classification of events. In an embodiment, extracted features, such as on/off events, are grouped based on a particular rule, e.g. in accordance with a minimum distance classifier, without prior knowledge of how electric loads behave. An embodiment organizes load events into peer groups based on the similarity of their power signatures, e.g. power level, duration, number of events, power changes, etc. Simple load shapes can be constructed in this manner, and 'real' ones tend to have lots of instances (class members). An embodiment includes detecting when classes have multiple members and considering such classes as legitimate classes which can be mapped to real physical loads. An embodiment indentifies load instances from structured classification, e.g. with electric load models, and uses such load instances as class templates. As well, such embodiment looks for left-over instances, missed during the structured classification. These class templates can also be used to map instances from unstructured classification to real physical loads.

Unstructured Classification—Event Matching Examples

Figure 19:
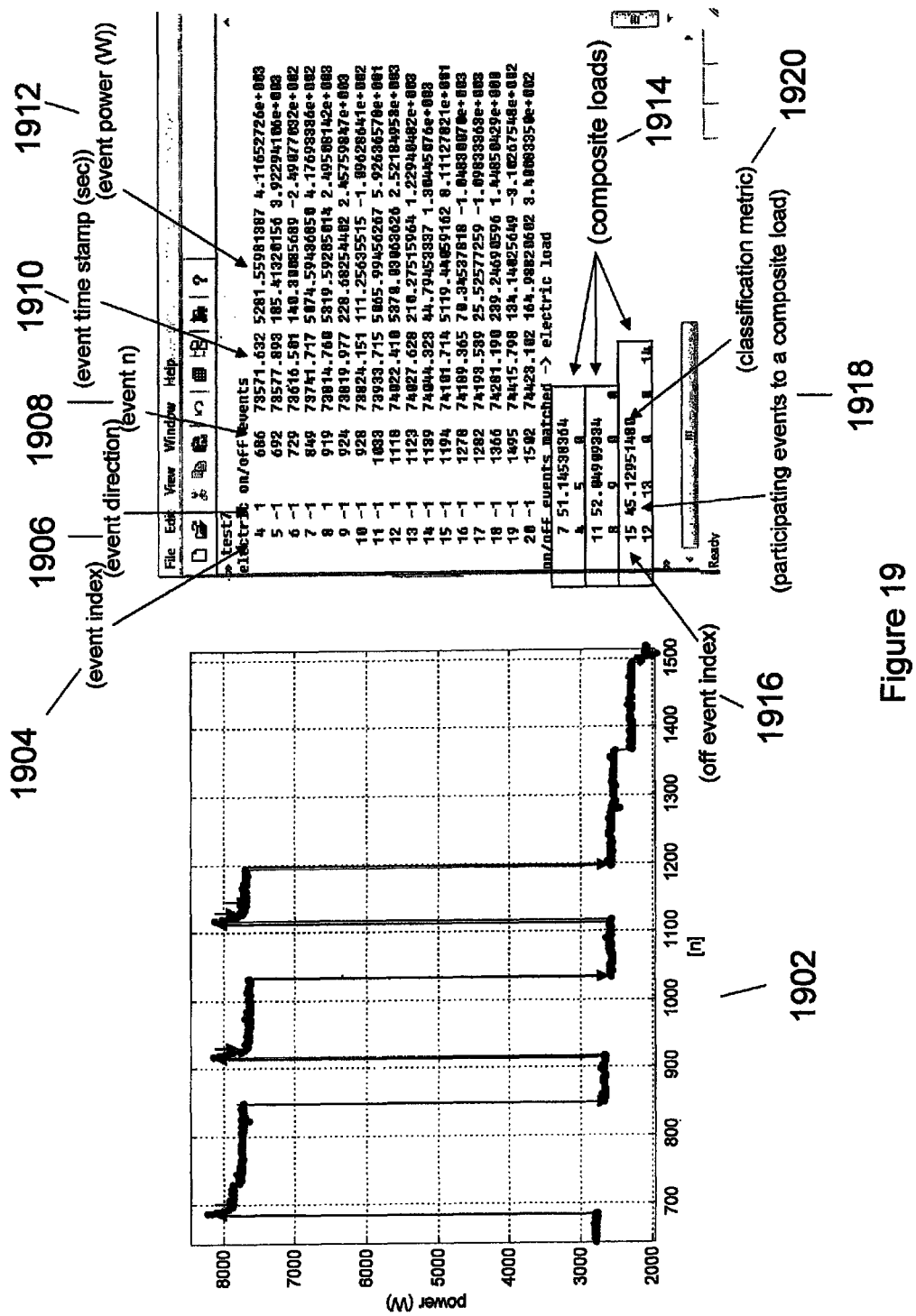
FIG. 19 contains a graph of power (w) versus events at time stamp n and contains a sample screen shot of a display of the associated event data, according to an embodiment.

The following has been found to be true from performing examples in accordance with embodiments described herein. For example, in an embodiment, an event classifier is provided that can match either a single on event and a single off event for a single load, or multiple on and off events for a composite load, as can be understood with reference to FIG. 19. FIG. 19 contains a graph 1902 of power (w) versus time (n is a sample index). Further, FIG. 19 contains a sample screen shot of a display of the associated event data. For example, FIG. 19 shows an event index column 1904, an event direction column 1906, event n stamp 1908, event time stamp in seconds 1910, and event power in Watts 1912. As well, the system and method determined particular on/off events for which there was a match. More particularly, three sets of loads, i.e. composite loads 1914 were detected. The third set illustrates an off event index 1916 in the first row of data and its associated classification metric 1920, with events 12, 13 and 14 participating to compose the load, as indicated by 1918.

Figure 20:
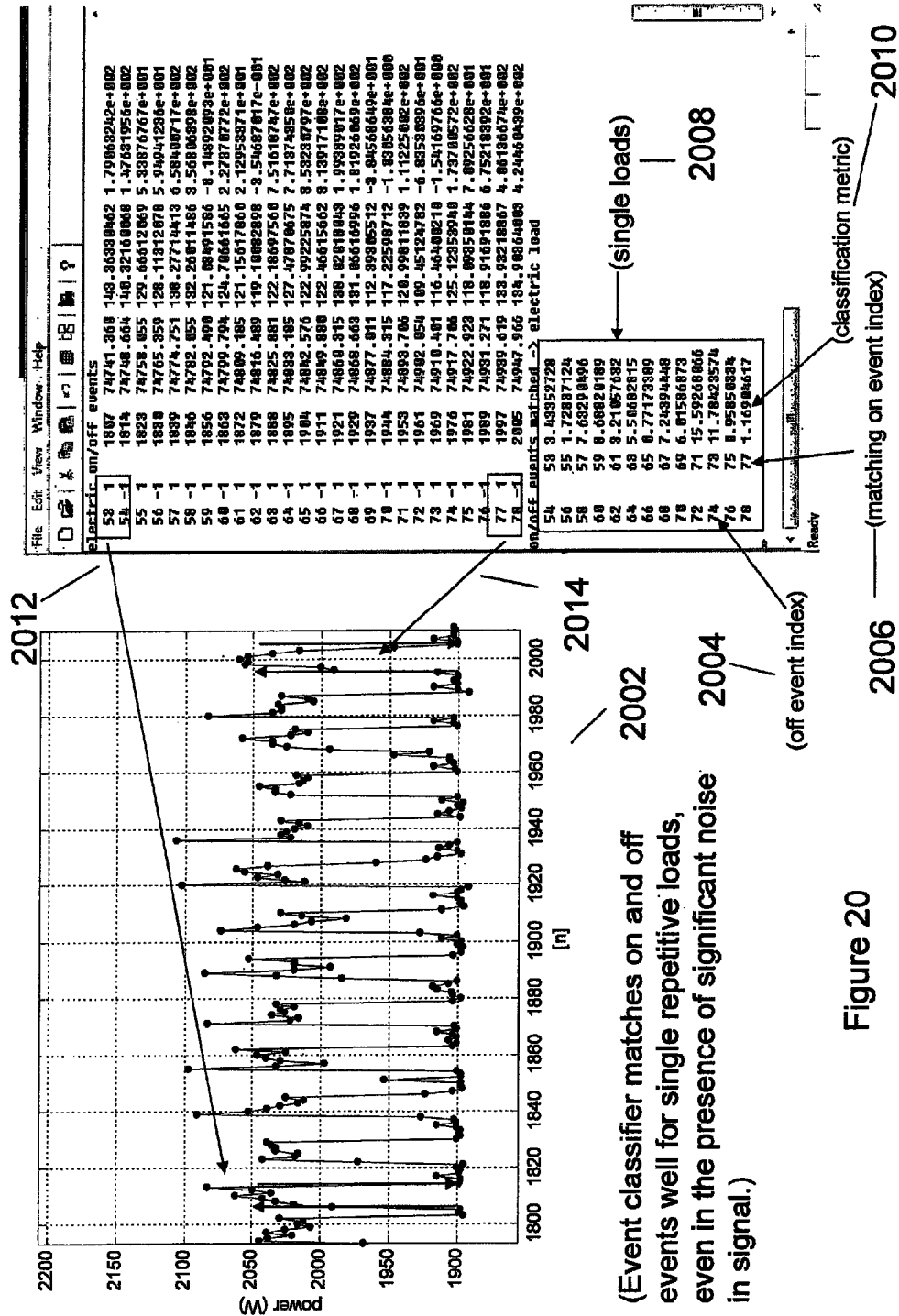
FIG. 20 is a graph that shows an event classifier matches on and off events well for single repetitive loads, even in the presence of significant noise in signal, according to an embodiment.

An embodiment provides an event classifier that matches on and off events well for single repetitive loads, even in the presence of significant noise in signal. FIG. 20 is a graph that shows an event classifier matches on and off events well for single repetitive loads, even in the presence of significant noise in the signal. Specifically, the numeric data from on/off event pairs 2012 and 2014 correspond to particular portions on the graphical image 2002. Data for single loads are displayed in their own window 2008. In window 2008 are shown a table in which the first column lists the off events index 2004, the second columns lists the matching on events index 2006, and the last column lists the corresponding classification metric 2010 for the matching on/off event pairs.

Figure 21:
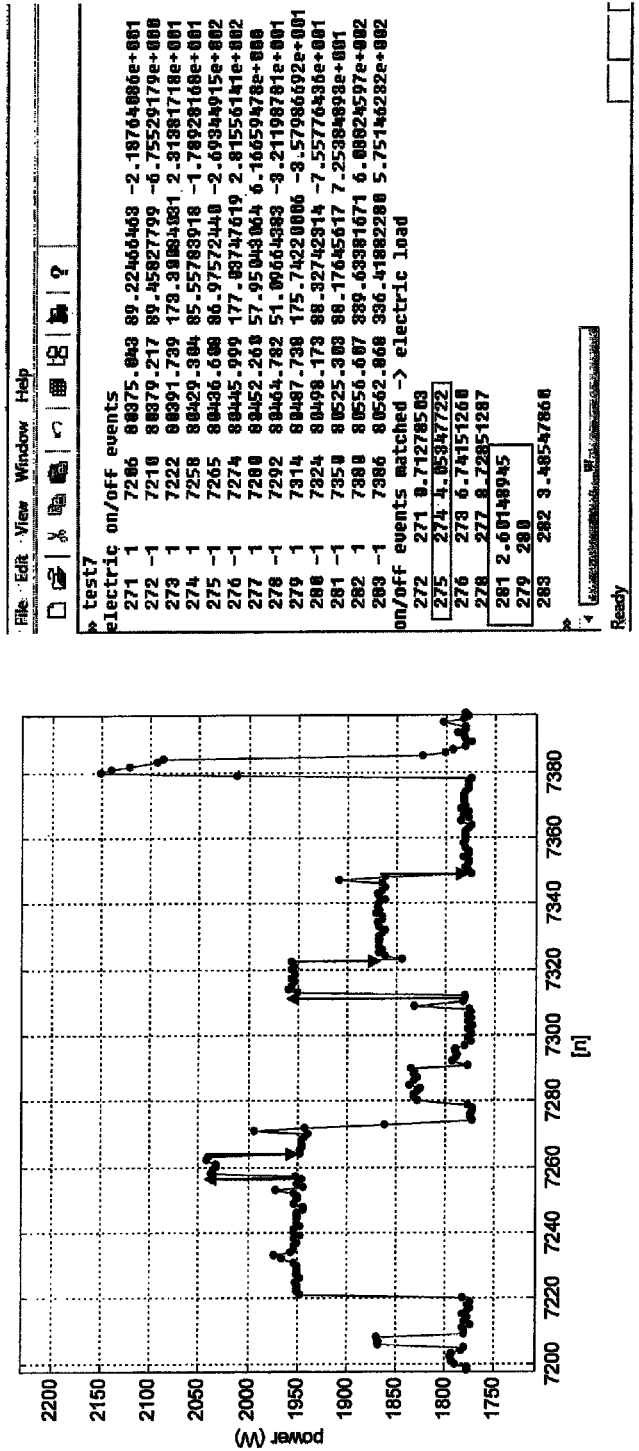
FIG. 21 is a graph showing that an event classifier can handle both single and composite load events at the same time, according to an embodiment.

An embodiment provides an event classifier that handles both single and composite load events at the same time. FIG. 21 is a graph showing that an event classifier can handle both single and composite load events at the same time.

Figure 22:
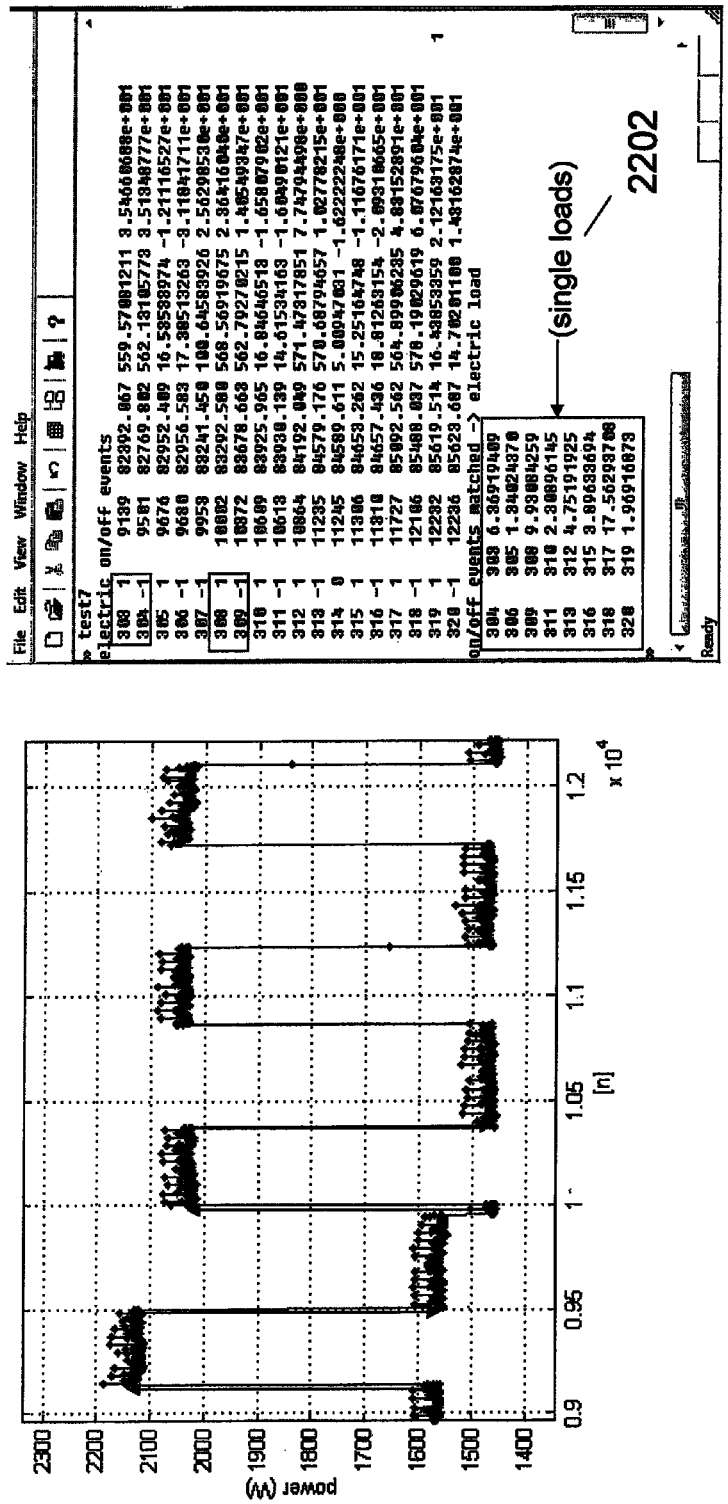
FIG. 22 is a graph showing an event classifier works well even when there is a baseload change, according to an embodiment.

It should be appreciated that it has been found that an event classifier according to an embodiment works well even when there is a baseload change, as can be understood by FIG. 22, which even depicts single loads 2202.

Unstructured Classification Examples (without Prior Knowledge of Electric Loads)

The following has been found to be true from performing examples in accordance with embodiments described herein. More particularly, two limitations of unstructured classification have been found to be as follows:

Difficult to recognize complex load events.

Difficult to map recognized events to physical loads, i.e. appliances.

These difficulties can be alleviated to a certain degree, when load instances from structured classification are used as class templates for unstructured classification.

An Example Machine Overview

Figure 23:
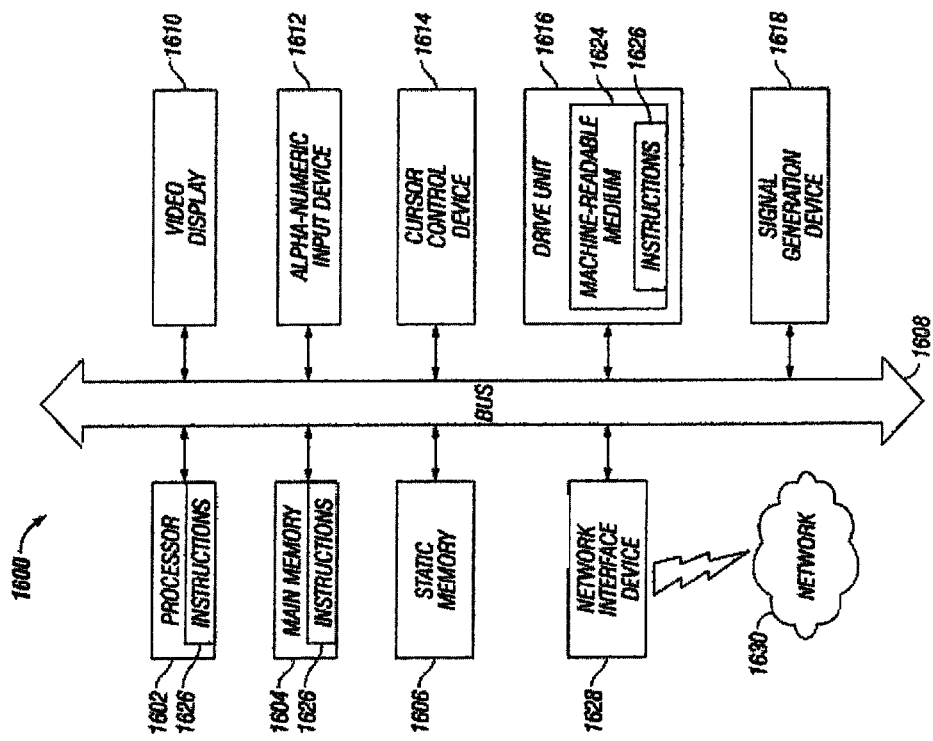
FIG. 23 is a block schematic diagram of a machine in the exemplary form of a computer system within which a set of instructions may be programmed to cause the machine to execute the logic steps according to an embodiment.

FIG. 23 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infra-red signals, digital signals, etc.; or any other type of media suitable for storing or transmitting information.

It should be appreciated that in an embodiment, network interface devices may include those that are targeted for HAN device, smart meter and server communication.

It should further be appreciated that an embodiment provides a gateway device that may be a portable or embedded electronic device. For example, it is contemplated that an embodiment provides gateway devices similar to the iPad, by Apple, Inc., or the iPhone, also by Apple, Inc., rather than being like a traditional computer. The server, where higher level analytics are executed, may be a traditional computer, however.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for load recognition from a monitored signal and application to energy management service, comprising the steps of:
    extracting, by a feature extraction algorithm processor, features from a set of power data using a feature extraction algorithm to obtain a plurality of events, wherein the set of power data reflects power consumed by one or more loads;
    initializing, by an initializing processor, a load library repository with initial load instance data, the initial load instance data comprising: initial estimates of state probabilities and state transition probabilities that represent a plurality of loads;
    performing a load recognition algorithm, by a load recognition algorithm processor, said load recognition algorithm comprising the steps of:
    for an event x from said plurality of events:
    assigning, by an assigning processor, said event x and particular subsequent events to a particular load,
    wherein the assigning is based on said particular load giving a best posterior probability from a best posterior probability algorithm performed on said plurality of events, and
    wherein said assigning is performed after performing a search and classification algorithm on said plurality of events; and
    adding, by an adding processor, load instance data associated with said particular load to said load library repository and continuing the adding load instance data for a next available event from said plurality of events; and
    updating based on said adding of load instance data, by an updating processor, said load library repository with new state probabilities and state transition probabilities;
    repeating said load recognition algorithm using the updated load library repository until a particular criterion is met; and
    using, by an energy management service processor, said added load instance data in providing energy consuming feedback and usage analysis to be used for energy management service;
    wherein said updated load library repository is used in a continuous mode on a continuous stream of power data from the plurality of loads and wherein when said added load instance data is added, combining said added load instance data with said initial load instance data to compute said new state probabilities and state transition probabilities from said combination;
    said continuous mode further comprising the steps of:
    extracting in real time, by said feature extraction algorithm, features from a window of said stream of power data for eligible events of said plurality of events in said window, performing a roughly estimated assignment to the particular load based on a state and state transition probability of each eligible event only;
    if there are not enough subsequent events for each roughly assigned event from said window and past windows of power data, then return to said extracting in real time step, otherwise:
    performing load recognition, by said load recognition algorithm, to a roughly assigned event with enough subsequent events based on a highest posterior probability search and classification and creating load instance recognition data;
    marking, by a marking processor, said roughly assigned event with said enough subsequent events as used;
    adding, by said adding processor, said load instance recognition data to said load library repository;
    updating based on the added load instance recognition, by said updating processor, state and state transition probability estimates for said particular load data; and
    with the arrival of a new window of power data, repeating said steps beginning from said step of extracting in real time features from said window of stream of power data;
    wherein said plurality of loads comprise a plurality of appliances.

2. The computer implemented method of claim 1, wherein said particular load is any of electric, gas, and water.

3. The computer implemented method of claim 1, wherein said particular load is electric and said stream of power data is from a power sensor and is received at any of said power sensor itself, a gateway console that is in communication with said power sensor, and a server when said gateway console is in communication with said server and sends said stream of power data to said server.

4. The computer implemented method of claim 3, wherein said feature extraction algorithm is performed at any of said power sensor, said gateway console, and server.

5. The computer implemented method of claim 3, wherein said search and classification algorithm is performed at any of said power sensor, said gateway console, and said server.

6. The computer implemented method of claim 3,
    wherein said energy management service processor or parts of said energy management service processor are embedded in any of said power sensor, said gateway console, and said server.

7. The computer implemented method of claim 2, wherein said energy management service processor is configured to target particular appliances for energy efficiency, demand response service, and time of use related energy saving tips by performing any of:
    monitoring and controlling various networked appliances, integrating renewable generation and storage of energy, providing security, providing site automation service,
integrating site entertainment function, and
controlling how utilities are consumed, generated, and stored.

8. The computer implemented method of claim 1, wherein said energy consuming feedback is made available to one or more consumers via any of: a web interface, a mobile device interface, e-mail, mail, and a telephone call.

9. The computer implemented method of claim 1, wherein said added load instance data comprises any of profile information about a particular site, time, duration, and energy used.

10. The computer implemented method of claim 1, wherein said feature extraction comprises detecting and computing changes of mean and variance at each segment boundary of said signal wherein said computed changes of mean and variance are used in maximum likelihood estimates of unknown load events.

11. The computer implemented method of claim 3, wherein load states are grouped based on how one or more electric components of a particular appliance are physically used to accomplish a mission and a resulting power consumption behavior change of the particular appliance.

12. The computer implemented method of claim 1, wherein said search and classification algorithm prunes impossible sequences from a search stack based on a state probability and state transition probability and uses a time limit for the particular load.

13. The computer implemented method of claim 1, wherein said best posterior probability is computed for a load i, given x, as the product of likelihood and prior probability, where p(x) is a normalization factor:

$$P(H_i \mid x) = \frac{p(x \mid H_i) P(H_i)}{p(x)},$$

where $p(x|H_i) = xi(\xi) = P(1 \rightarrow 2)*p(x|2)*P(2 \rightarrow 3)*p(x|3)* \ldots *P(n-1 \rightarrow n)$, and
where $p(x|k) = p(x_k|k) = p(mean_k|k)*p(variance_k|k)*p(time_k|k)$, and is defined to be the kth state probability that is the product of probability density functions of mean, variance, and time estimates from feature extraction.

14. The computer implemented method of claim 1, further comprising the steps of:
computing an energy fitness number, f, defined by:

$$f = e \prod_i n_i$$

wherein e is an energy footprint multiplied by products of normalization factors, $n_i$;
wherein e is defined by:

$$e = \frac{C}{N} = \frac{\int_T E(t) S(t)\, dt}{N}$$

wherein C is defined as cost of energy for a time period T, N is defined as a number of persons in a household, E(t) is defined as energy consumption at time t, and S(t) is price of energy at time t; and providing said energy fitness number to consumers to educate said consumers about the impacts of their energy usage and to promote behavioral and psychological changes among said consumers.

15. A system for load recognition from a monitored signal and application to energy management service, comprising:
a feature extraction algorithm processor configured for extracting features from a set of power data using a feature extraction algorithm to obtain a plurality of events, wherein the set of power data reflects power consumed by one or more loads;
an initializing processor configured for initializing a load library repository with initial load instance data, the initial load instance data comprising: initial estimates of state probabilities and state transition probabilities that represent a plurality of loads;
a load recognition algorithm processor configured for performing a load recognition algorithm, comprising the steps of:
for an event x from said plurality of events:
assigning, by an assigning processor, said event x and particular subsequent events to a particular load,
wherein the assigning is based on said particular load giving a best posterior probability from a best posterior probability algorithm performed on said plurality of events, and
wherein said assigning is performed after performing a search and classification algorithm on said plurality of events; and
adding, by an adding processor, load instance data associated with said particular load to said load library repository and continuing the adding load instance data for a next available event from said plurality of events; and
updating based on said adding of load instance data, by an updating processor, said load library repository with new state probabilities and state transition probabilities,
repeating said load recognition algorithm using the updated load library repository until a particular criterion is met; and
using, by an energy management service processor, said added load instance data in providing energy consuming feedback and usage analysis to be used for energy management service;
wherein said updated load library repository is used in a continuous mode on a continuous stream of power data from the plurality of loads and wherein when said added load instance data is added, combining said added load instance data with said initial load instance data to compute said new state probabilities and state transition probabilities from said combination;
said continuous mode further comprising the steps of:
extracting in real time, by said feature extraction algorithm, features from a window of said stream of power data for eligible events of said plurality of events in said window, performing a roughly estimated assignment to the particular load based on a state and state transition probability of each eligible event only;
if there are not enough subsequent events for each roughly assigned event from said window and past windows of power data, then return to said extracting in real time step, otherwise:
performing load recognition, by said load recognition algorithm, to a roughly assigned event with enough subsequent events based on a highest posterior probability search and classification and creating load instance recognition data;

marking, by a marking processor, said roughly assigned event with said enough subsequent events as used;
adding, by said adding processor, said load instance recognition data to said load library repository;
updating based on the added load instance recognition, by said updating processor, state and state transition probability estimates for said particular load data; and
with the arrival of a new window of power data, repeating said steps beginning from said step of extracting in real time features from said window of stream of power data;
wherein said plurality of loads comprise a plurality of appliances.

16. A non-transitory machine-readable storage medium storing one or more sequences of instructions for load recognition from a monitored signal and application to energy management service, which instructions, when executed by one or more processors, cause the one or more processors to carry out the steps of:
    extracting, by a feature extraction algorithm processor, features from a set of power data using a feature extraction algorithm to obtain a plurality of events, wherein the set of power data reflects power consumed by one or more loads;
    initializing, by an initializing processor, a load library repository with initial load instance data, the initial load instance data comprising: initial estimates of state probabilities and state transition probabilities that represent a plurality of loads;
    performing a load recognition algorithm, by a load recognition algorithm processor, said load recognition algorithm comprising the steps of:
    for an event x from said plurality of events:
    assigning, by an assigning processor, said event x and particular subsequent events to a particular load,
    wherein the assigning is based on said particular load giving a best posterior probability from a best posterior probability algorithm performed on said plurality of events, and
    wherein said assigning is performed after performing a search and classification algorithm on said plurality of events; and
    adding, by an adding processor, load instance data associated with said particular load to said load library repository and continuing the adding load instance data for a next available event from said plurality of events; and
    updating based on said adding of load instance data, by an updating processor, said load library repository with new state probabilities and state transition probabilities,
    repeating said load recognition algorithm using the updated load library repository until a particular criterion is met; and
    using, by an energy management service processor, said added load instance data in providing energy consuming feedback and usage analysis to be used for energy management service;
    wherein said updated load library repository is used in a continuous mode on a continuous stream of power data from the plurality of loads and wherein when said added load instance data is added, combining said added load instance data with said initial load instance data to compute said new state probabilities and state transition probabilities from said combination;
    said continuous mode further comprising the steps of:
    extracting in real time, by said feature extraction algorithm, features from a window of said stream of power data for eligible events of said plurality of events in said window, performing a roughly estimated assignment to the particular load based on a state and state transition probability of each eligible event only;
    if there are not enough subsequent events for each roughly assigned event from said window and past windows of power data, then return to said extracting in real time step, otherwise:
    performing load recognition, by said load recognition algorithm, to a roughly assigned event with enough subsequent events based on a highest posterior probability search and classification and creating load instance recognition data;
    marking, by a marking processor, said roughly assigned event with said enough subsequent events as used;
    adding, by said adding processor, said load instance recognition data to said load library repository;
    updating based on the added load instance recognition, by said updating processor, state and state transition probability estimates for said particular load data; and
    with the arrival of a new window of power data, repeating said steps beginning from said step of extracting in real time features from said window of stream of power data;
    wherein said plurality of loads comprise a plurality of appliances.

17. A computer implemented method for searching and for classifying events for load recognition, comprising the steps of:
    iterating over available events:
        for a given event x of said available events, searching, by a searching processor, possible state transition sequences for a load i, wherein subsequent events after said given event x are considered in finding the state transition sequences for said load, wherein said given event x and said subsequent events are referred to collectively as vector x, and;
            pruning, by a pruning processor, impossible state transition sequences from a particular search stack, based on state or based on state transition probability for a particular time limit and until possible state sequences are found;
            computing, by a computing processor, a likelihood xi, for candidates and choosing a state sequence with a maximum xi;
            computing a posterior probability of said load i, for said vector x, wherein the posterior probability of load i is a product of likelihood and prior probability and p(x) is a normalization factor according to:

$$P(H_i \mid x) = \frac{p(x \mid H_i)P(H_i)}{p(x)}$$

repeating for other load candidates, with respect to said given event X;
        choosing, by a choosing processor, a load k, that has a highest posterior probability given event x;
        updating, by an updating processor, with instance recognition data of said load; and
        marking, by a marking processor, events used to select said load that has the highest posterior probability as used.

* * * * *